United States Patent [19]
Okuda et al.

[11] Patent Number: 5,892,762
[45] Date of Patent: Apr. 6, 1999

[54] BUFFER CONTROL SYSTEM

[75] Inventors: Masato Okuda; Toshiyuki Sudo; Tomohiro Ishihara; Michio Kusayanagi, all of Kanagawa, Japan

[73] Assignee: Fujitsu Limited, Kanagawa, Japan

[21] Appl. No.: 651,594

[22] Filed: May 22, 1996

[30] Foreign Application Priority Data

Jul. 14, 1995 [JP] Japan ..................... 7-179259

[51] Int. Cl.⁶ .................................................. H04J 3/02
[52] U.S. Cl. ............................................ 370/395; 370/412
[58] Field of Search ................................. 370/395, 412, 370/413, 414, 415, 416, 417, 418, 428, 429, 465, 468, 377, 378, 389, 392, 396, 397, 398, 399

[56] References Cited

U.S. PATENT DOCUMENTS

| | | | |
|---|---|---|---|
| 5,233,606 | 8/1993 | Pashan et al. | 370/418 |
| 5,253,251 | 10/1993 | Aramaki | 370/418 |
| 5,499,238 | 3/1996 | Shon | 370/415 |
| 5,555,264 | 9/1996 | Sällberg et al. | 370/414 |
| 5,640,389 | 6/1997 | Masaki et al. | 370/418 |

OTHER PUBLICATIONS

Eugen Wallmeier and Tom Worster; The Spacing Policer, An Algorithm for Efficient Peak Bit Rate Control in ATM Networks; Oct. 1992.

Primary Examiner—Huy D. Vu
Attorney, Agent, or Firm—Helfgott & Karas, PC.

[57] ABSTRACT

A buffer control system is a system for implementing both a priority control process and a shaping process of cells with a hardware configuration of a small size in a network routing fixed-length packets which are respectively composed of transfer data and control information added to the transfer data, and to which priority information is assigned, according to the control information. If a cell written to an empty area of a cell buffer is a prioritized cell, and its expected output time is a time slot, an address where the cell is stored in the cell buffer is arranged in a time slot in a prioritized cell entry memory. When it reaches the time to read the cell stored in the time slot, the address stored in the time slot is written to an output list chain, and the cell is read from that address. The empty area of the buffer is managed using a free list chain.

29 Claims, 45 Drawing Sheets

PRIORITIZED CELL □   NON-PRIORITIZED CELL ▨

| ADDRESS | DATA |
|---|---|
| 0 | 1 |
| 1 | non |
| 2 | 4 |
| 3 | 9 |
| 4 | 3 |
| ⋮ | ⋮ |
| ff | |

※ ADDRESS NO ENCLOSED BY PARENTHESES INDICATES ADDRESS OF CELL BUFFER 26

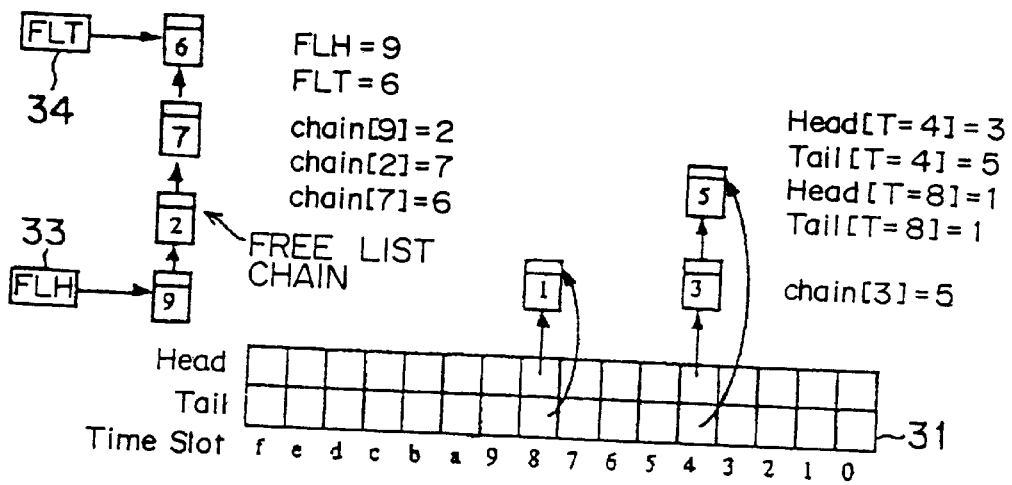
FIG. 11A   ⇩ CELL TO BE OUTPUT TO T=4 ARRIVED
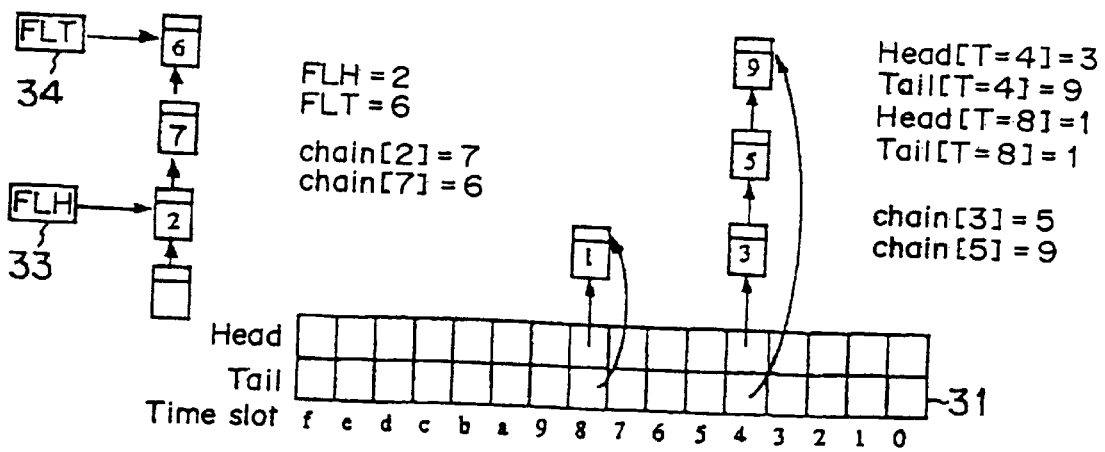
FIG. 11B

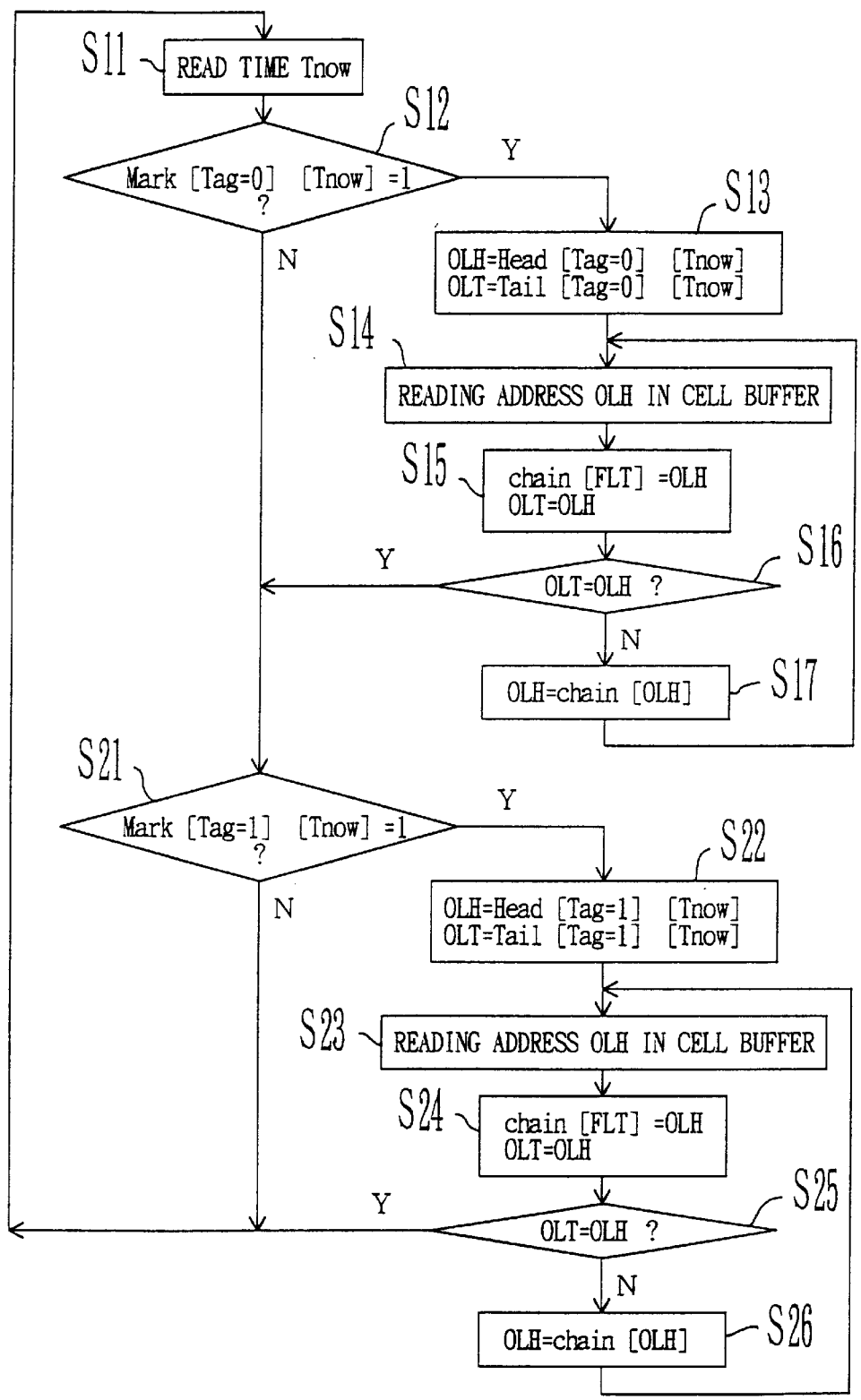
F I G. 1 4

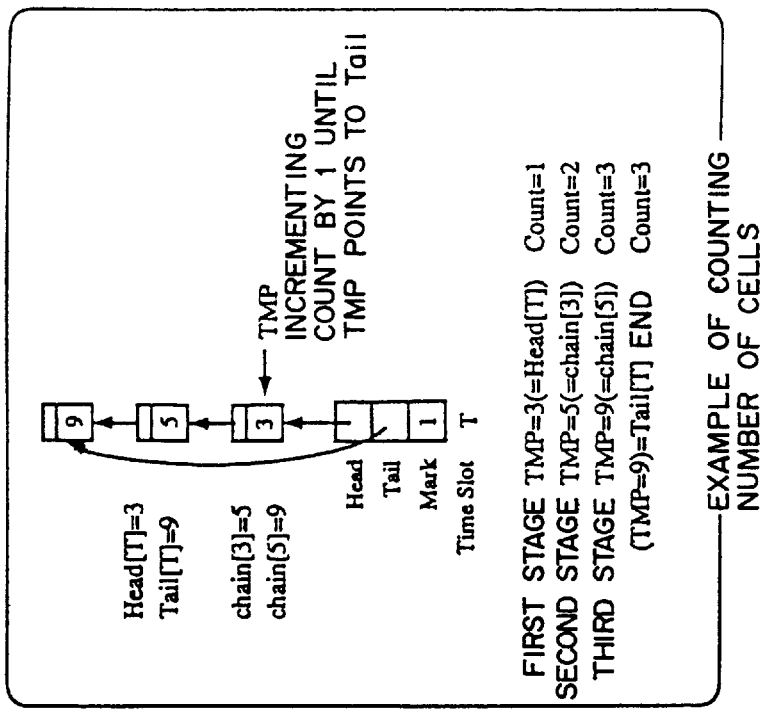

```
for ( all Time Slot T ) do
{
   /*NUMBER OF CELLS LINKED TO CHAIN IN TIME SLOT "T"*/
   if Mark[T] == 1 then
   {
      Count = 1
      TMP = Head[T]
      while TMP != Tail[T] do
      {
         Count ++
         TMP = chain[TMP]
      }
   }
}
```

FIG. 16B

Head[T]=3
Tail[T]=9 chain[3]=5
chain[5]=9

TMP INCREMENTING COUNT BY 1 UNTIL TMP POINTS TO Tail

FIRST STAGE   TMP=3(=Head[T])      Count=1
SECOND STAGE  TMP=5(=chain[3])     Count=2
THIRD STAGE   TMP=9(=chain[5])     Count=3
              (TMP=9)=Tail[T] END  Count=3

───── EXAMPLE OF COUNTING NUMBER OF CELLS ─────

FIG. 16A

A
```
/* SPECIFYING TIME SLOT 'T' OF STORING CHAIN
              WHOSE NUMBER OF CELLS IS LARGEST */
if Count >Count.max then
{
   Tmax=T
   Count.max=Count
}
}
/* FORCIBLE DISCARD */        SPECIFYING CHAIN TO BE
chain [FLT] =Head [Tmax]      DISCARDED ACCORDING TO
FLT=Tail [Tmax]               VALUE OF TIME SLOT 'T'
```

B
```
/* SPECIFYING HEAD & TAIL OF CHAIN
              WHOSE NUMBER OF CELLS IS LARGEST */
if Count >Count.max then
{
   Tmax.Head=Head [T]
   Tmax.Tail=Tail [T]
   Count.max=Count
}
/* FORCIBLE DISCARD */        SPECIFYING CHAIN TO BE
chain [FLT] =Tmax.Head        DISCARDED ACCORDING TO
FLT=Tmax.Tail                 Head & Tail OF CHAIN
```

FIG. 17

DISCARDED IS CHAIN OF Time Slot [8]

DISCARDED IS CHAIN OF Time Slot [4]

```
/* SEARCH START */
Tsearch = Tnow-1
while Mark [Tsearch] !=1 do
{
 Tsearch=Tsearch-1
}
/* FORCIBLE DISCARD */
chain [FLT] =Head [Tsearch]
FLT=Tail [Tsearch]
```

FIG. 20

```
/* SEARCH START */
Tsearch = Tnow+1
while Mark [Tsearch] !=1 do
{
    Tsearch=Tsearch+1
}
/* FORCIBLE DISCARD */
chain [FLT] =Head [Tsearch]
FLT=Tail [Tsearch]
```

FIG. 22

```
/* SEARCH START */
Tsearch = Tnow+1
while FLS<TH do
{
while Mark [Tsearch] >=1 do
  {
    Tsearch=Tsearch+1
  }
/* FORCIBLE DISCARD */
chain [FLT] =Head [Tsearch]
FLT=Tail [Tsearch]
}
```

FIG. 24

```
/* SEARCH START */
Tsearch = Tnow+1
while Mark [Tsearch] !=1 do
{
   Tsearch=Tsearch+1
}
/* FORCIBLE DISCARD */
chain [FLT] =Head [Tsearch]
FLT=Tail [Tsearch]
```

FIG. 27

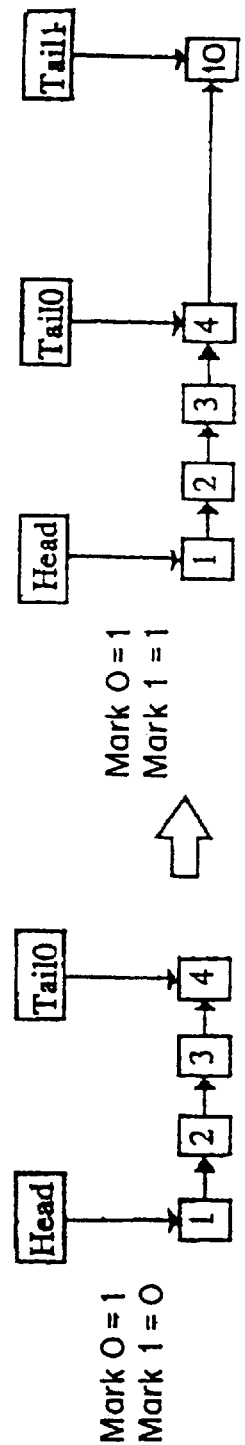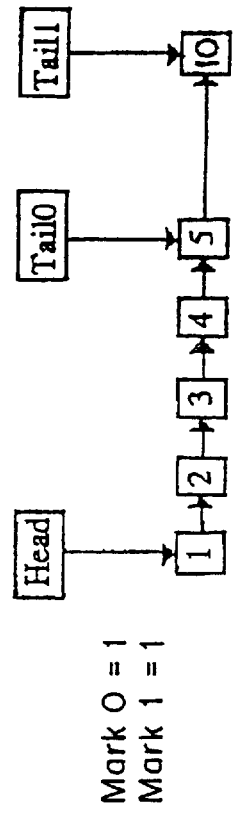
FIG. 29A
FIG. 29B
FIG. 29C

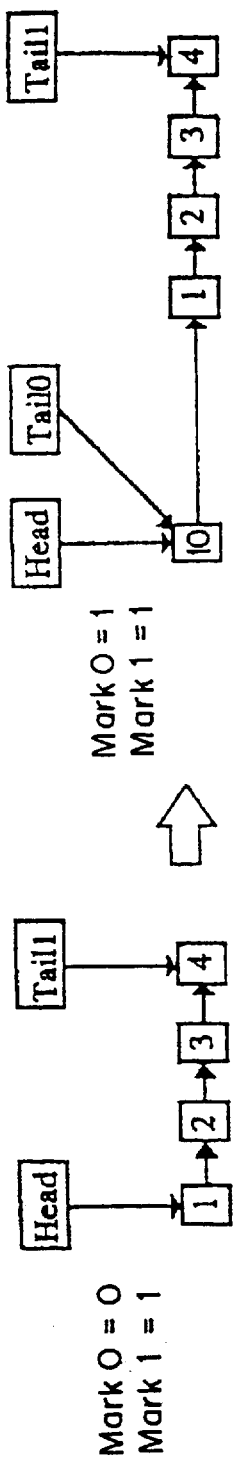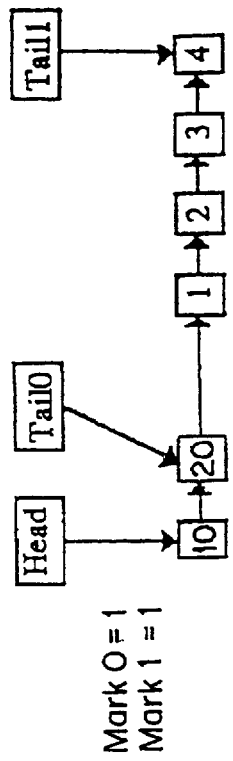
FIG. 30A
FIG. 30B
FIG. 30C

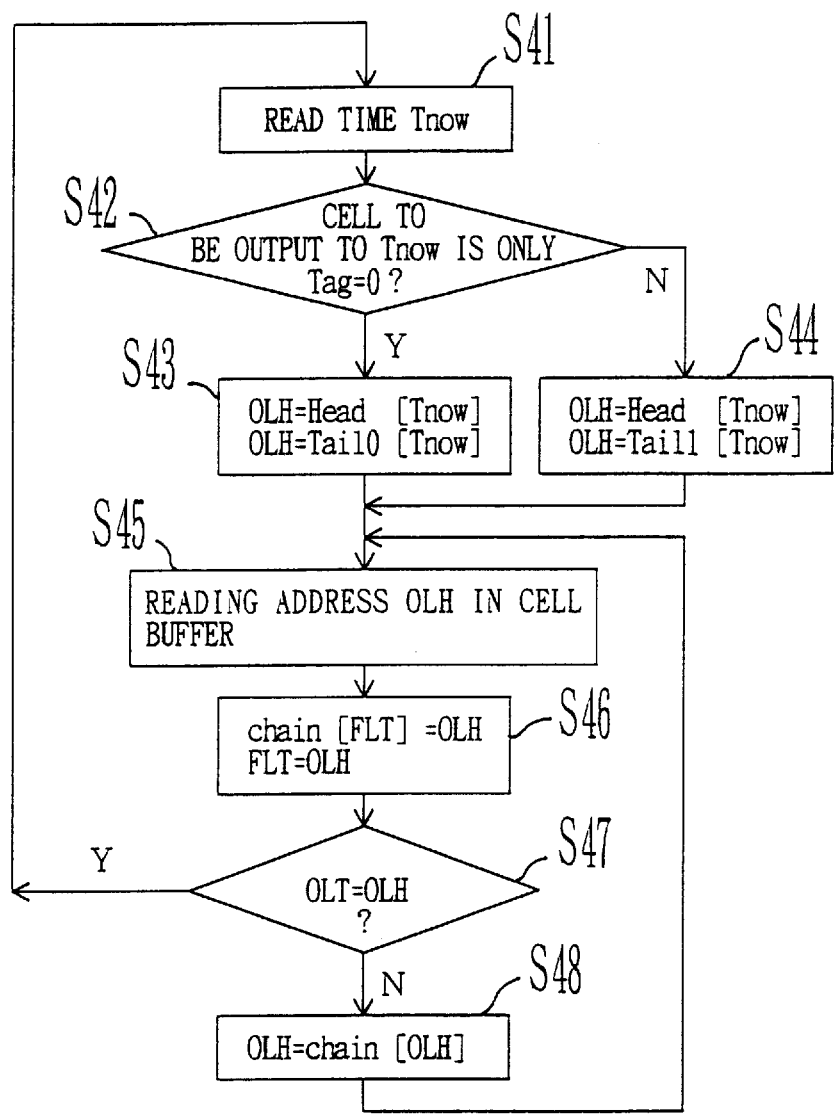
F I G. 3 1

| VPI/VCI | OUTPUT LINE |
|---------|-------------|
| VCI 1 | # 0 |
| VCI 2 | # 0 |
| VCI 3 | # 1 |
| ⋮ | ⋮ |

```
for ( all port.number num ) do
{
    port[num].Count=0
    for (all Time Slot T) do
    {
        port[num].Count = port[num].Count + port[num].Mark[Tag=1]
    }
}
```

FIG. 36B

```
for ( all port.number num ) do
{
    port[num].Count = 0
    for (all Time Slot T) do
    {
        if ( Mark[Tag]=1 ) then
        {
            TMP = Head[T]
            port[num].Count ++
            while TMP != Tail[T] do
            {
                TMP = chain[TMP]
            }
        }
    }
}
```

FIG. 36C

```
if ( Tag=1 cell input ) then
{
    port[num].Count = port[num].Count + 1
}
if ( Tag=1 cell output ) then
{
    port[num].Count = port[num] -1
}
```

```
for ( all port_number num ) do
{
   for ( all Time Slot T ) do
   {
      if ( Mark[Tag=1][T]=1 ) then
      {
         chain[FLT] = Head[T]
         FLT = Tail[T]
      }
   }
}
```

F I G. 37

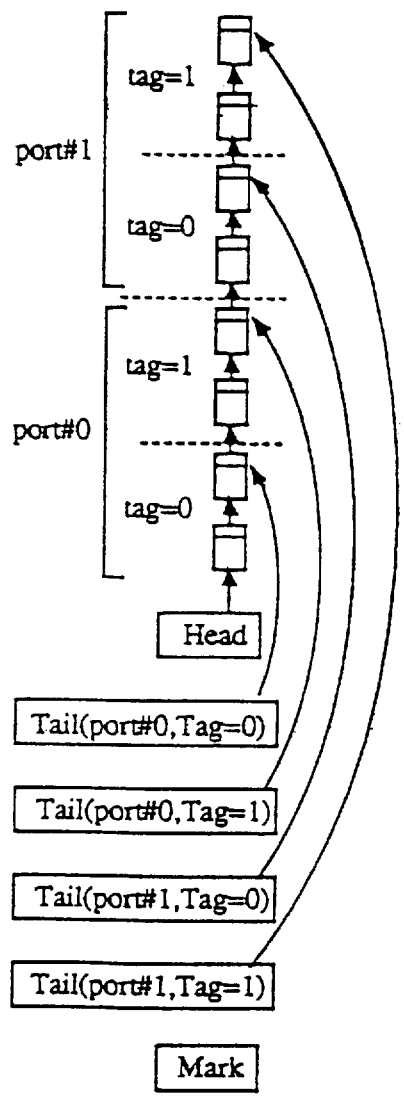
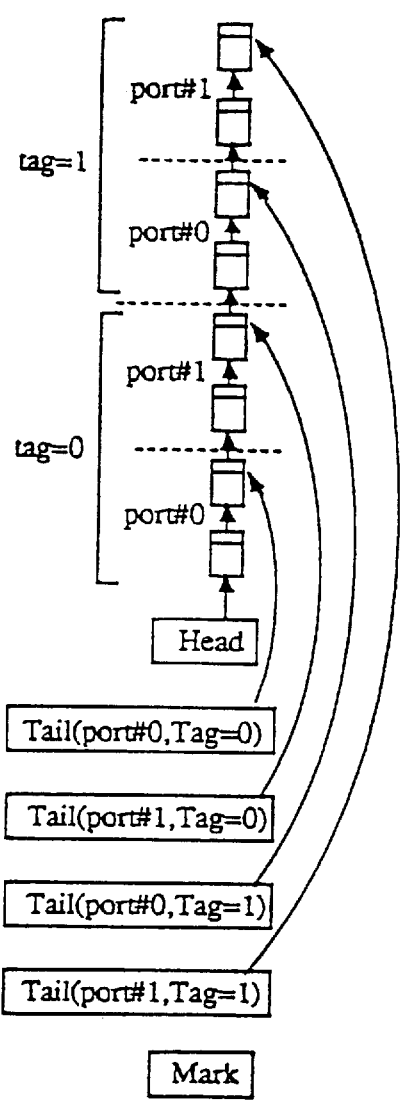
FIG. 43A
FIG. 43B

BUFFER CONTROL SYSTEM

FIELD OF THE INVENTION

The present invention relates to a buffer control system storing transfer data, and more particularly, to a system for controlling reading/writing from/to a buffer storing ATM cells.

DESCRIPTION OF THE RELATED ART

In recent years, a service simultaneously handling various forms of communications data, including image data which require a faster transmission speed, in addition to speech data, text data, etc., has become more and more essential. The core technique of this service is an ATM system (Asynchronous Transfer Mode).

The ATM system takes advantage of a cell composed of a fixed-length payload of 48 octets to which control information (such as destination information, etc.) called a header is added, as a data transfer unit (data exchange unit).

Currently, discussions about an ABR (Available Bit Rate) service are frequently made as a method for applying the ATM technique to a high-speed data communications network such as a LAN, WAN, etc. in an ATM forum. With the ABR service, a congestion control is performed between a network and a terminal for each connection.

In the ABR communication, a cell called an RM cell (resource management cell) is transmitted for each predetermined number of data cells when a data transmitting terminal transmits data cells. A network and/or a receiving terminal writes information such as resource information in the network, control information indicating whether or not a congestion occurs within the network, etc. to the RM cell, and returns that cell to the transmitting terminal. After the transmitting terminal receives the RM cell including the control information, etc. from the network, it calculates an ACR (Allowed Cell Rate) according to the control information. The ACR is a cell rate (a speed of transmitting cells) at which the transmitting terminal is allowed to transmit cells to the network. The transmitting terminal transmits the cells at the ACR depending on need.

Thus, the transmitting terminal dynamically changes the rate for transmitting cells according to a congestion state of a network, etc. in the ABR communication, thereby avoiding the congestion state of the network, and restoring the network from the congestion state.

Additionally, in the ABR communication, a minimum usable band MCR (Minimum Cell Rate) is set according to negotiations between a user and a network when a call is established. This setting is made by a call reception control CAC (Call Admission Control) for each connection.

The network monitors a cell rate for each connection. If the cell rate does not exceed the MCR, the network guarantees a quality of a requested service QOS (Quality of Service) for the connection. In FIG. 1, for example, since the cell rate before a time $T_1$ and after a time $T_2$ is equal to or less than the MCR, the quality of the requested service for this connection is guaranteed. On the other hand, in the duration between the time $T_1$ and the Time $T_2$, the cell rate is equal to or more than the MCR. Therefore, the quality of the requested service for this connection is not guaranteed, and cells may be discarded.

Generally, a UPC (Usage Parameter Control) capability supported in a UNI (User Network Interface) performs the above described monitoring of the cell rate. If the cell rate exceeds the MCR, the cells corresponding to the exceeding portion (shaded in FIG. 1) are defined as non-prioritized cells. The cells other than the non-prioritized cells are defined to as prioritized cells. To make a distinction between a non-prioritized cell and a prioritized cell, a CLP (Cell Loss Priority) bit of a header in each cell is used. That is, the value "0" is assigned to the CLP bit for the prioritized cell, and the value "1" is assigned to the CLP bit for the non-prioritized cell.

In the ABR communication as described above, prioritized cells and non-prioritized cells may sometimes be mixed even in one connection, depending on a state of a network and a cell transfer rate of the transmitting terminal, which are changeable as time goes by.

In a system where prioritized cells and non-prioritized cells are mixed, a cell buffer 1001 is arranged in a predetermined location of a network (such as an input portion of a switch, or an output portion of the switch), as shown in FIG. 2. Furthermore, a prioritized cell buffer 1002 for storing a prioritized cell and a non-prioritized cell buffer 1003 for storing a non-prioritized cell are separately arranged in the cell buffer 1001. If a cell rate is increased, the quality of the prioritized cell is guaranteed by, for example, discarding non-prioritized cells stored in the non-prioritized cell buffer 1003, etc. In the example shown in FIG. 2, the cells "a" and "c" are prioritized cells and the cell "b" is a non-prioritized cell.

However, if information of a strong burst nature such as a data communication between LANs is multiplexed, a method for simply reading a cell stored in a cell buffer may not only fail to assure a quality of a non-prioritized cell, but a quality of a prioritized cell. That is, if the prioritized cell is input to the cell buffer in a burst-like manner and the prioritized cell is sequentially read without considering a read interval, the interval between the prioritized cells to be output becomes short. If a capability of processing a cell is beyond the limitations of a device succeeding the cell buffer (such as a switch), even the prioritized cell is discarded. As a result, the quality of a requested service "QOS", such as a cell loss rate, is degraded.

To overcome this problem, a shaping capability for adjusting an interval of reading a cell from the cell buffer is required. A conventional buffer control method, however, implements a capability of performing a priority control between a prioritized cell and a non-prioritized cell, and the shaping capability of adjusting the interval of reading a cell from the cell buffer, by using respective buffers. That is, a shaping buffer 1004 is additionally arranged succeeding the cell buffer 1001 shown in FIG. 2. Since two buffers are required to be arranged in order to implement the above described two capabilities, a hardware configuration is expanded.

Additionally, in the ABR communication as described above, a prioritized cell and a non-prioritized cell may be mixed in one connection. The conventional buffer control method, however, does take such a form of communication into account. Therefore, as shown in FIG. 2, for example, if the prioritized cell "a", non-prioritized cell "b", and prioritized cell "c", are sequentially input to the cell buffer 1001, and the prioritized cells are read prior to the non-prioritized cell in order to assure the quality of the prioritized cells after the prioritized cells "a" and "c" are stored in the prioritized cell buffer 1002 and the non-prioritized cell "b" is stored in the non-prioritized cell buffer 1003, and the prioritized cells "a" and "c" and the non-prioritized cell "b" are output in this order. If a transfer order of cells in a cell buffer changes as described above, a receiving side cannot reassemble packets of transmitted data.

To also solve this problem, the shaping capability is essential. With the conventional method, however, a hardware configuration may be expanded as described above.

SUMMARY OF THE INVENTION

The object of the present invention is to implement a priority control of transmitted cells, and a shaping capability of adjusting an interval between cells, with a hardware configuration of a small size.

The buffer control system according to the present invention is a system for use with a network (such as an ATM network) routing fixed-length packets, which are respectively composed of transfer data and control information added to the transfer data, and include priority information, according to the control information.

The buffer control system according to the present invention comprises:

a storage unit for storing an input fixed-length packet; an output time determination unit for determining an output time according to control information of the fixed-length packet, and generates output time information about the fixed-length packet; an identification unit for identifying a priority assigned to the fixed-length packet, and generating priority information for the fixed-length packet; and a control unit for controlling a process of writing the fixed-length packet to the storage unit, and a process of reading the fixed-length packet from the storage unit, according to the output time information and the priority information.

When the fixed-length packet is received, it is stored in the storage unit. At this time, the output time determination unit references the control information of the fixed-length packet, and determines when it will be read from the storage unit and output. The identification unit identifies a priority of the fixed-length packet stored in the storage unit. The control unit reads the fixed-length packet from the storage unit, and outputs the read packet according to the result determined by the output time determination unit. If a timing of outputting a fixed-length packet with higher priority and that of outputting a fixed-length packet with lower priority overlap, and if all of fixed-length packets cannot be output, the fixed-length packet with lower priority is discarded.

BRIEF DESCRIPTION OF THE DRAWINGS

FIGS. 11A and 11B are schematics showing operations of inputting cells;

FIG. 14 is a flowchart showing the operations performed by the control unit when reading a cell;

FIG. 16A shows an example of counting the number of cells;

FIG. 16B shows an example of a pseudo-code program describing a process of counting the number of cells;

FIG. 17A shows an example of pseudo-code program describing a process of discarding cells from a time slot whose number of cells is the largest;

FIG. 17B shows an other example of pseudo-code program describing a process of discarding cells from a time slot whose number of cells is the largest;

FIG. 20 shows an example of a pseudo-code program describing the process of forcibly discarding non-prioritized cells shown in FIG. 19;

FIG. 22 shows an example of a pseudo-code program describing the process of forcibly discarding non-prioritized cells shown in FIG. 21;

FIG. 24 shows an example of a pseudo-code program describing the process of continuing to forcibly discard non-prioritized cells shown in FIG. 23;

FIG. 27 shows an example of a pseudo-code program describing the process of forcibly discarding all of the non-prioritized cells shown in FIG. 16;

FIGS. 29A, 29B and 29C are schematics showing operations of inputting cells (No.1);

FIGS. 30A, 30B and 30C are schematics showing operations of inputting the cells (No.2);

FIG. 31 is a flowchart showing a process of reading a cell performed by the control unit in the buffer shown in FIG. 26;

FIGS. 32A and 32B show variations where the buffer according to the present invention is arranged in a multiplexer;

FIG. 32C shows a variation where the buffer according to the present invention is arranged in a distributor (demultiplexer);

FIG. 34 shows an example of a data structure of an output path table;

FIGS. 36A through 36C show examples of pseudo-code programs describing a process of counting the number of non-prioritized cells stored in a cell buffer for each output line, and forcibly discarding non-prioritized cells to be output to an output line whose number of non-prioritized cells is the largest;

FIG. 37 shows an example of a pseudo-code program describing a process of forcibly discarding all of the non-prioritized cells;

FIGS. 43A and 43B show variations of the buffer according to the second embodiment;

FIG. 43A shows a method for generating a chain in the order of output lines;

FIG. 43B shows a method for generating the chain in the order of cell priorities;

DESCRIPTION OF THE PREFERRED EMBODIMENT

Figure 3:
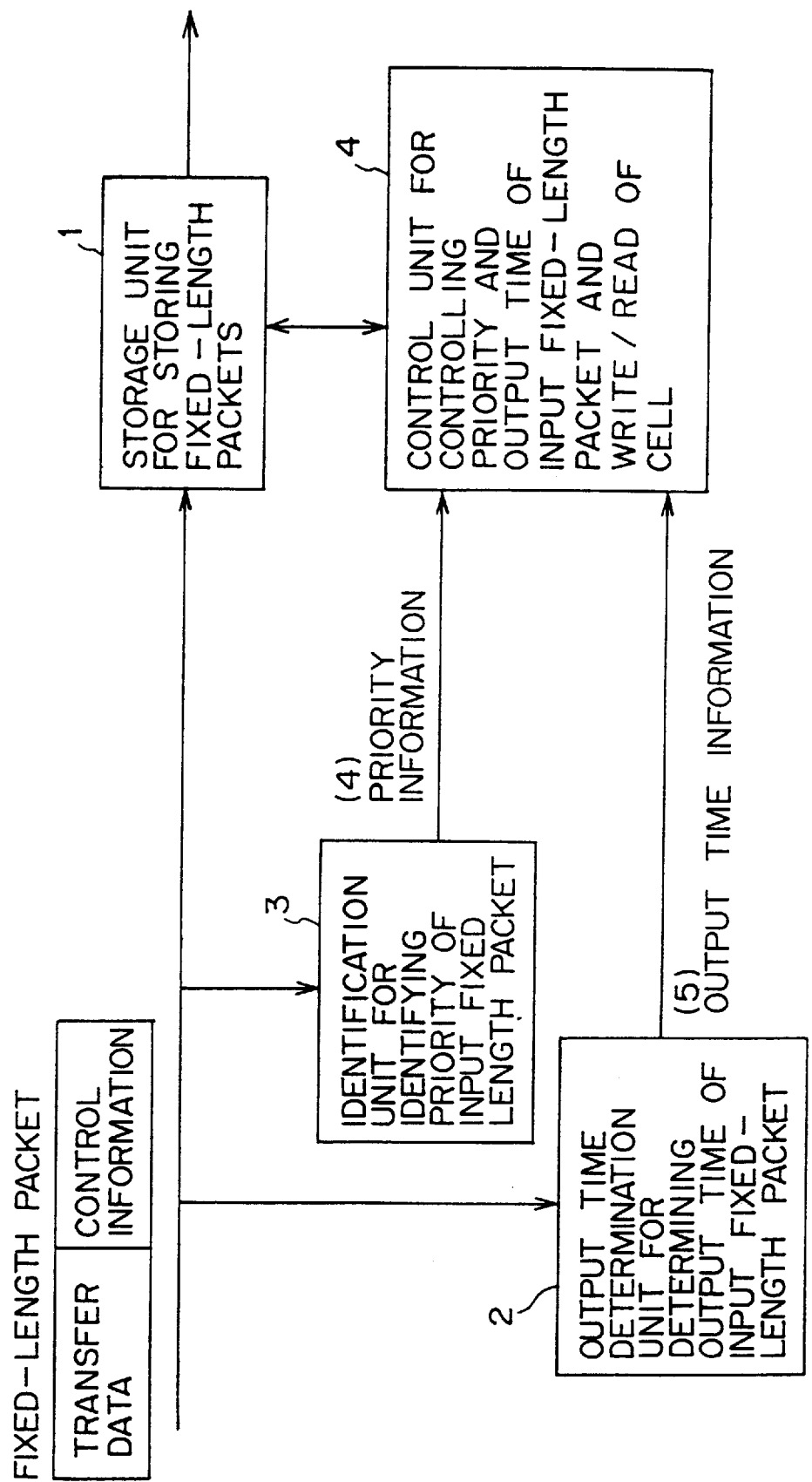
FIG. 3 shows a principle of the present invention.

First of all, the explanation about the principle of the present invention is provided below, with reference to FIG. 3.

The buffer control system according to the present invention assumes a buffer control system for use with a network routing fixed-length packets which are respectively composed of transfer data and control information added to the transfer data, and include priority information. This system comprises the following units.

A storage unit 1 is a memory such as a RAM, etc., which stores an input fixed-length packet.

An output time determination unit 2 determines an output time according to the control information of the input fixed-length packet (such as a VPI/VCI if a fixed-length packet is assumed to be an ATM cell), and generates output time information about the fixed-length packet. The output time determination unit 2 comprises, for example, a table of correspondence between control information of the input fixed-length packet and an interval of reading fixed-length packets from the storage unit 1.

An identification unit 3 identifies a priority assigned to the fixed-length packet by recognizing a predetermined bit value of the input fixed-length packet, and generates priority information about the fixed-length packet.

A control unit 4 controls a process of writing the fixed-length packet to the storage unit 1 and a process of reading the fixed-length packet from the storage unit 1, according to the output time information and the priority information. Furthermore, the control unit 4 discards a fixed-length packet with the lowest priority among fixed-length packets stored in the storage unit 1, if the size of an empty area in the storage unit 1 is equal to or less than a predetermined value.

The control unit 4 comprises a program describing the above described process, a processor executing the program, a memory storing the program, and a memory used for executing the above described process.

The control unit 4 performs processes of reading/writing the fixed-length packet using the output time information retrieved from each control information of the fixed-length packet. Accordingly, if an interval of reading the fixed-length packets from the storage unit 1 is specified as the output time information, a shaping process for the fixed-length packets can be performed for each control information.

The control unit 4 performs the processes of reading/writing the fixed-length packet according to a priority assigned to the fixed-length packet. If a need for discarding a fixed-length packet in order to prevent an overflow in the storage unit 1 arises, the control unit 4 forcibly discards a fixed-length packet with the lowest priority stored in the storage unit 1. That is, the quality of a fixed-length packet with higher priority is assured by performing the priority control process according to a priority assigned to a fixed-length packet.

Thus, the above described shaping process and the priority control process can be implemented by controlling the processes of reading/writing a fixed-length packet from/to the storage unit 1 by the control unit 4. Furthermore, the control unit 4 can perform these two processes in parallel.

Provided below is the explanation about the embodiment according to the present invention, by referring to the drawings. This embodiment assumes an ATM network.

Figure 4:
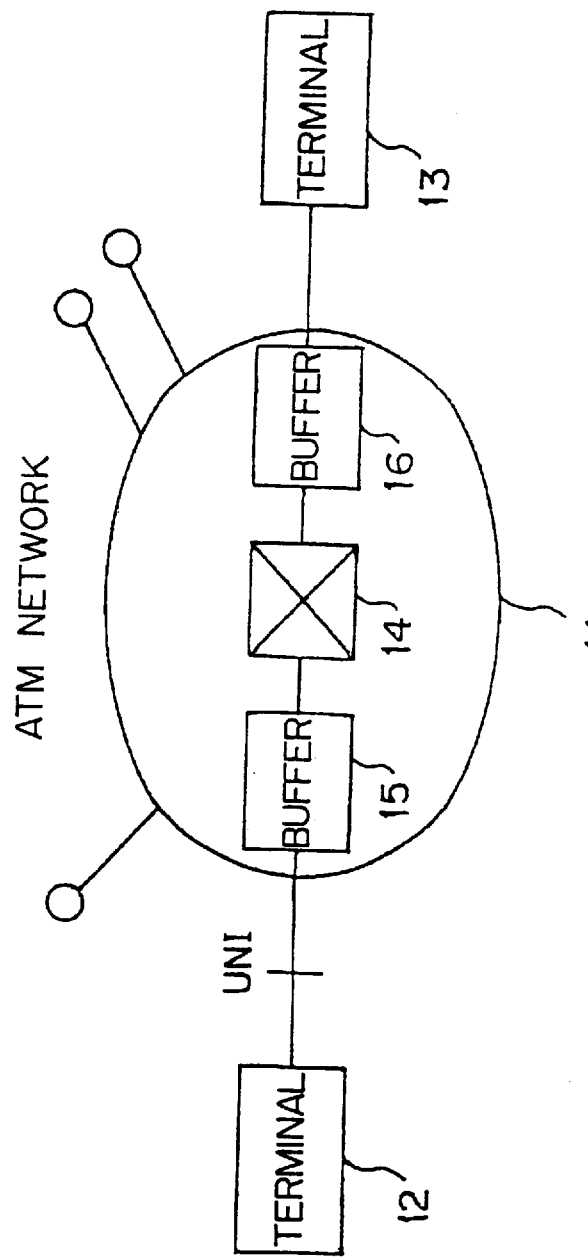
FIG. 4 is a simplified block diagram showing a configuration of an ATM network including buffers according to the present invention.
Figure 5:
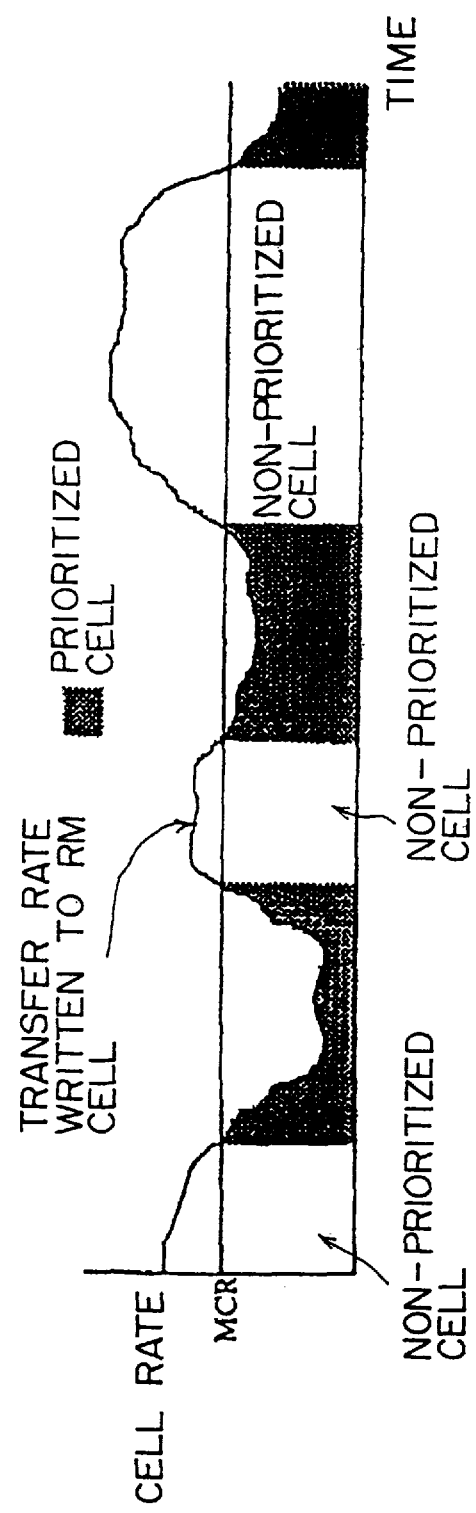
FIG. 5 shows an operation of setting prioritized and non-prioritized cells.

FIG. 4 shows an outline of an ATM network where buffers according to the present invention are arranged.

The ATM network 11 includes a plurality of terminals starting from terminal 12. When data is transferred from the terminal 12 to the terminal 13, the terminal 12 attaches identifiers VPI/VCI (Virtual Path Identifier/Virtual Channel Identifier) indicating a route from the terminal 12 to the terminal 13 to a header of each cell, and transmits the cell to the ATM network 11. The cell is self-routed according to the VPI/VCI in a switch 14, and output to a line connected to the terminal 13.

Buffers 15 and 16 according to this embodiment arranged in, for example, an entry point or an exit point of the switch 14, perform a shaping process controlling that a cell transfer rate does not exceed a predetermined value (such as a capacity of a virtual path VP), and performs a control such as a quality assurance control according to a priority of each cell or a connection.

In the meantime, the ABR communication monitors if the cell transfer rate via each connection (each VPI/VCI) does not exceed a minimum usable band MCR (Minimum Cell Rate) set for each connection, as described above. If the cell transfer rate of one connection exceeds the MCR, the priorities of the cells in that connection are made lower in order to assure the quality of the other connections. The cells whose priorities are made lower (non-prioritized cells) are discarded before prioritized cells if a congestion etc. occurs in the buffer according to this embodiment, which will be described later in detail.

Figure 1:
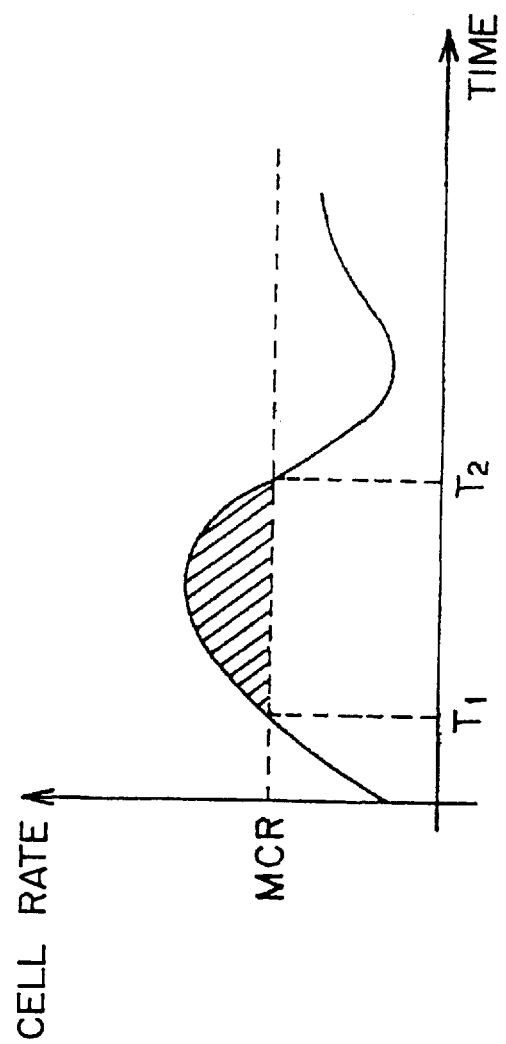
FIG. 1 is a schematic showing an ABR communication.
Figure 2:
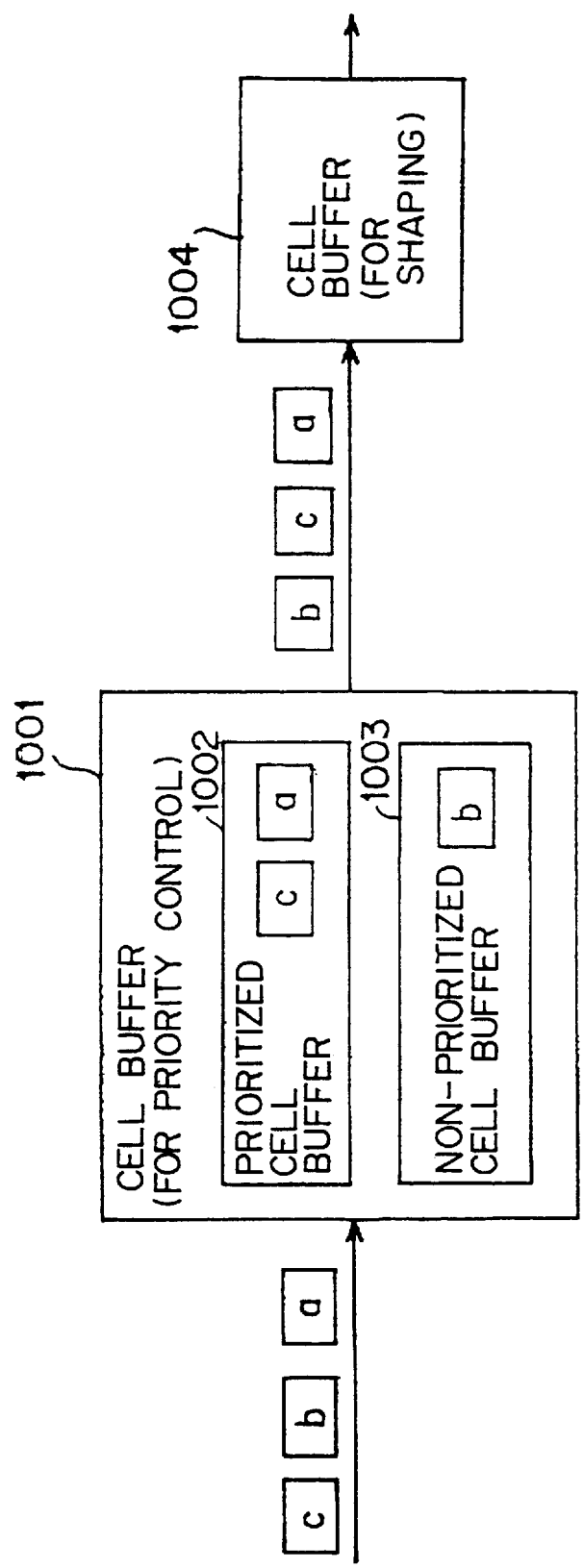
FIG. 2 is a schematic showing a configuration of a conventional buffer performing a priority control of cells.

As a method for assigning (controlling) a priority of a cell, the following two methods may be used. The first method is that a UPC (Usage Parameter Control) capability arranged in a UNI (User Network Interface) monitors a transfer rate for each connection, and cells corresponding to an exceeding portion (shaded in FIG. 1) are defined as non-prioritized cells and the cells other than the non-prioritized cells are defined as prioritized cells, if the transfer rate exceeds the MCR. Distinction between a prioritized cell and a non-prioritized cell is made by using a CLP (Cell Loss Priority) bit in a header of each cell, and assigning the values "0" and "1" to the prioritized cell and the non-prioritized cell respectively. In this case, the value "1" is assigned to the CLP bit of a violation cell which exceeds the MCR.

The second method takes advantage of an RM cell. Since each terminal writes a cell transfer rate of each connection to a CCR (Current Cell Rate) field of the RM cell at predetermined intervals, and informs this to an ATM network in the ABR communication, the ATM network can always recognize the transfer rate of each connection that changes as time goes by. The ATM network recognizes also the MCR for each connection. Accordingly, the ATM network never fails to know if the changing cell transfer rate exceeds the MCR. For the duration when the cell transfer rate exceeds the MCR, the ATM network specifies all of cells transferred via that connection as non-prioritized cells. To make a distinction between a prioritized cell and a non-prioritized cell, a predetermined bit of device tag information used in each of devices (ATM switches) in the ATM network, is used. In this case, the value "0" is written to the predetermined bit of the device tag information added to that cell if a cell is a prioritized cell, or the value "1" is written to the predetermined bit of the device tag information if the cell is a non-prioritized cell, at an entry point of each of the devices in the ATM network.

The buffer according to this embodiment handles a cell with a priority assigned using the above described first or second method. With the first method, a priority may be assigned using a CLP bit. With the second method, a priority may be assigned using device tag information. In both of the cases, writing "0" to either the CLP bit or the predetermined bit of the device tag information is defined as "tag=0", and writing "1" to either of the two is defined as "tag=1". Provided below is the explanation about the method taking advantage of the CLP bit.

The buffer according to this embodiment performs a priority control for cells to which priorities are assigned. This embodiment discloses cells assigned with two types of priorities (prioritized type/non-prioritized type), but many more degrees of priorities may be adopted. In this case, each cell displays its priority in an area of 2 bits or more.

Figure 6A:
FIG. 6A is a schematic showing an ABR communication.

As a result of assigning a priority to each cell using the above described method, a prioritized cell and a non-prioritized cell are mixed for one connection (for one VPI/VCI). FIG. 6A shows this state.

Otherwise, priority control may be performed for each connection using the buffer according to this embodiment. When both a CBR (Constant Bit Rate service and a UBR (Unspecified Bit Rate) service are simultaneously supported in an ATM network, qualities of a cell loss rate and a delay are stipulated in the CBR connection. Accordingly, the quality (QOS: Quality of Service) of each connection must be assured. In the meantime, a UBR connection is a method for setting only a PCR (Peak Cell Rate) as a traffic parameter, and does not provide any stipulations of the cell loss rate and the delay. If a network is not congested, communications are made using unused areas. If the network is congested, cells of the UBR connection are discarded in order to assure the quality of the cells of the CBR connection.

Figure 6B:
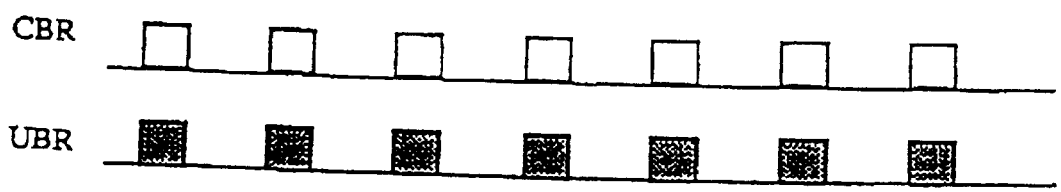
FIG. 6B is a schematic showing CBR and UBR communications.

In the case where the CBR service and the UBR service are simultaneously supported as described above, prioritized cells are transferred via the CBR connection, and non-prioritized cells are transferred via the UBR connection as shown in FIG. 6B. The buffer according to this embodiment performs a priority control for a connection by performing a priority control for cells transferred via these two connections.

Figure 7:
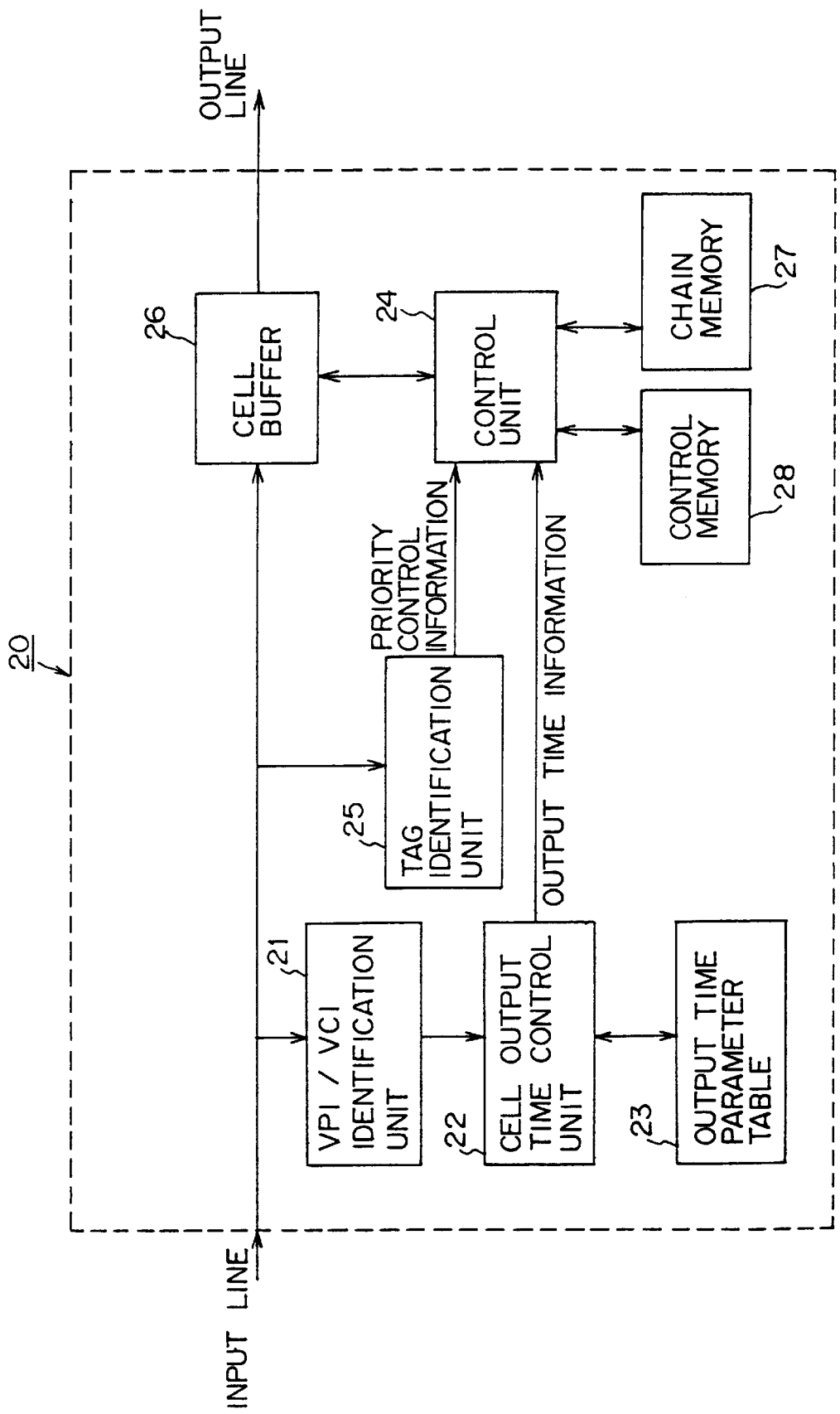
FIG. 7 is a functional block diagram showing a buffer according to the first embodiment of the present invention.

FIG. 7 is a functional block diagram showing a buffer according to the first embodiment of the present invention. A buffer 20 performs a priority control and a shaping process for a cell input from an input line, and outputs the processed cell to an output line.

A VPI/VCI identification unit 21 retrieves a VPI/VCI from a header of the input cell, and passes it to a cell output time control unit 22.

The cell output time control unit 22 searches an output time parameter table 23 using the VPI/VCI received from the VPI/VCI identification unit 21, retrieves output time information, and transfers the retrieved information to a control unit 24.

Figures 8A, 8B:
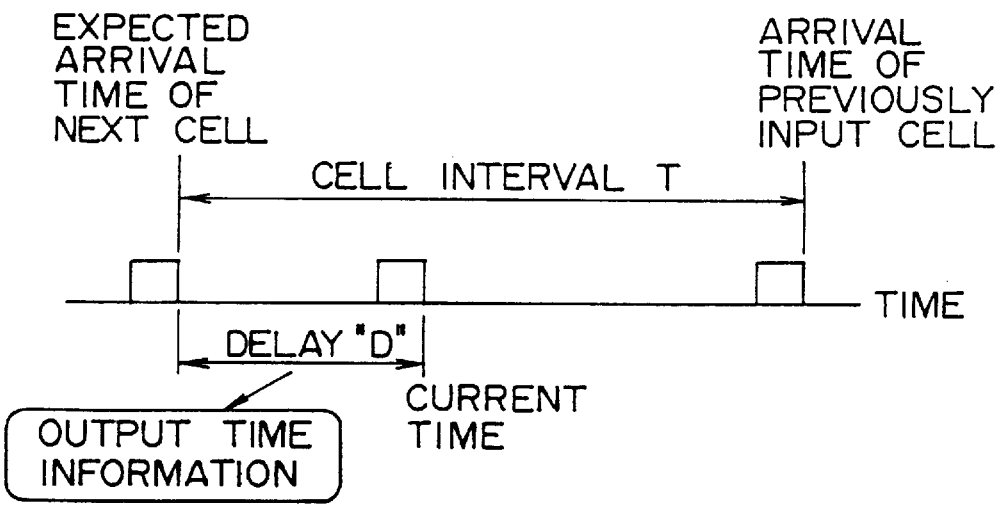
FIG. 8A shows an example of an output time parameter table.
FIG. 8B shows a generation of output time information.

The output time parameter table 23 stores parameters associated with an output time for each VPI/VCI. As shown in FIG. 8A, a minimum interval between cells to be output is set for each VPI/VCI. Information indicating the cell interval is written, for example, when establishing a call. The minimum interval is a parameter stipulating the shaping process, which is set in order to prevent the cells from being transmitted at an interval shorter than the minimum interval for one particular VPI/VCI.

The cell output time control unit 22 retrieves a cell interval "T" for the VPI/VCI of the input cell from the output time parameter table 23, and performs the following control. That is, as shown in FIG. 8B, the cell output time control unit 22 measures an interval between a currently input cell and a previously input cell (between an arrival time of the previously input cell and a current time) for the VPI/VCI retrieved by the VPI/VCI identification unit 21. If this interval is shorter than the above described cell interval "T", the cell output time control unit 22 obtains an amount of time elapsed from the arrival time of the previously input cell by the cell interval "T" (an expected arrival time of a next cell), and transfers an interval from the current time till the expected arrival time of the next cell (an amount of delay time D) to the control unit 24 as output time information.

If the interval between the currently input cell and the previously input cell (the duration between the arrival time of the previously input cell and the arrival of the currently input cell) is longer than the cell interval "T", this value is informed to the control unit 24.

A tag identification unit 25 retrieves a CLP bit from a header of the input cell, determines a priority of the input cell, and informs the control unit 24 of the priority of that input cell as priority control information. The tag identification unit 25 identifies the input cell as a prioritized cell if the CLP bit is "0". If the CLP bit is "1", that cell is identified as a non-prioritized cell.

A cell buffer 26 stores the input cell according to a control performed by the control unit 24. A chain memory 27 stores addresses in the cell buffer in the form of a chain. The chain memory 27 will be described later. A control memory 28 stores an address at which the input cell is stored and the like, according to the priority control information and the output time information of each cell, when the input cell is stored in the cell buffer 26. Details of the control memory 28 will be described later.

The control unit 24 receives the output time information and the priority control information respectively from the cell output time control unit 22 and the tag identification unit 25, and rewrites the contents of the chain memory 27 and the control memory 28 using this information. The control unit 24 then performs a control of writing the input cell to the cell buffer 26 and a control of reading the cells stored in the cell buffer 26, by taking advantage of the contents of the chain memory 27 and the control memory 28.

Figure 9:
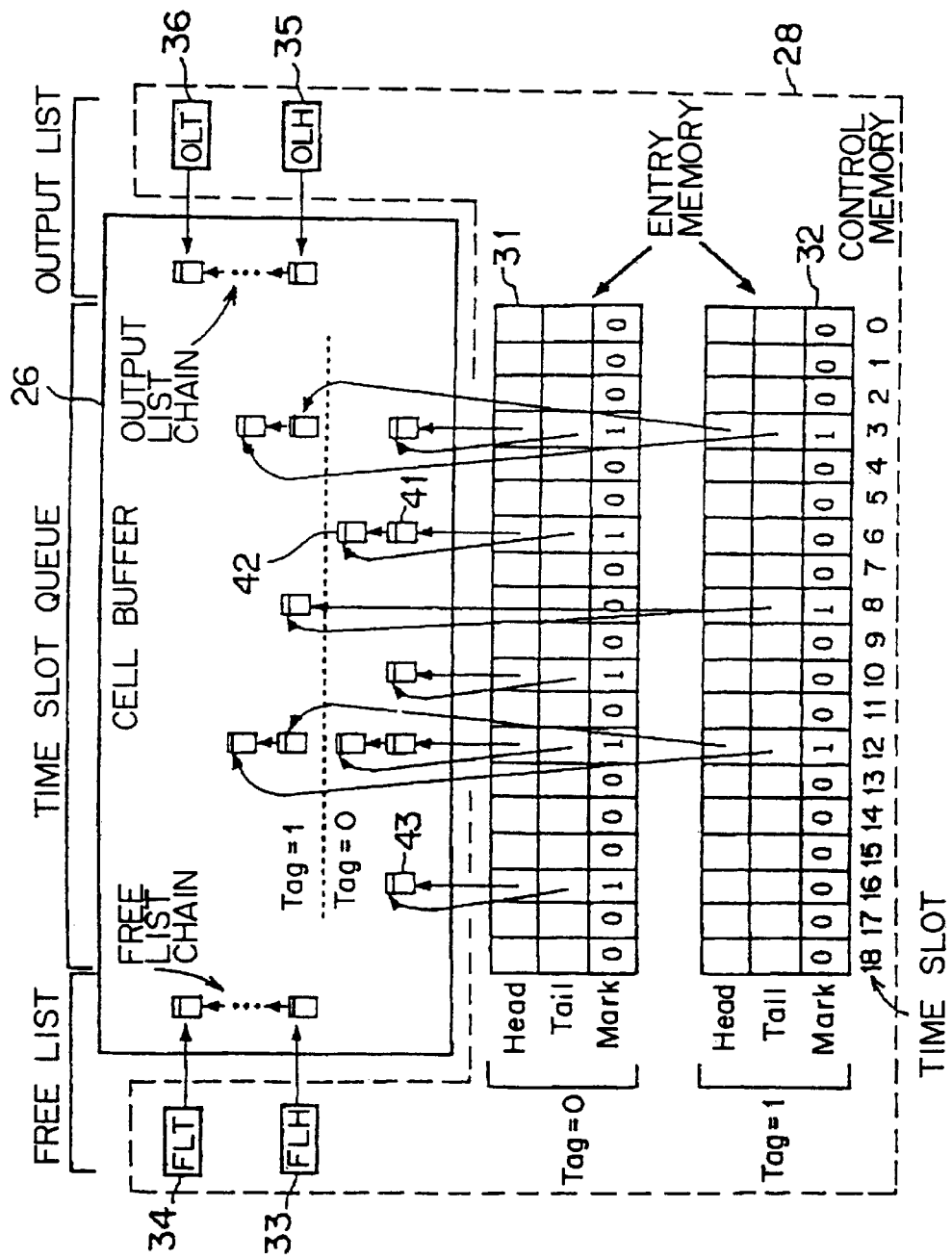
FIG. 9 shows an example of a cell buffer and a control memory according to the first embodiment.

FIG. 9 shows an example of structures of the cell buffer 26 and the control memory 28.

This figure shows the cell buffer 26 divided into a time slot queue portion, a free list portion, and an output list portion. These portions, however, are virtually divided by function, and they are actually a single storage area. If a cell is stored at a certain address, the address belongs to the time slot queue portion. The address belongs to the output list portion when the cell is output. After the cell is read, the address belongs to the free list portion. Furthermore, this figure shows the time slot queue portion in the cell buffer 26 as two divided areas ("Tag=0" and "Tag=1") according to the priorities of the cells. These areas are also virtually divided by function. That is, if a prioritized cell is stored in the cell buffer 26, it is stored in the area of "Tag=0". If a non-prioritized cell is stored in the cell buffer 26, it is stored in the area of "Tag=1".

The control memory 28 comprises a prioritized cell entry memory 31, a non-prioritized cell entry memory 32, and each type of register 33 through 36.

The prioritized cell entry memory 31 and the non-prioritized cell entry memory 32 are respectively divided into a plurality of time slots (numbered from 0 through 18 in this embodiment), each of which is composed of a "Head", a "Tail", and a "Mark".

The "Mark" is 1-bit data indicating if a cell is stored in a corresponding time slot. If the cell is stored, the "Mark" is set to "1". If the cell is not stored, it is set to "0".

If cells are stored in a time slot, a chain is generated according to the priorities of the cells for the time slot. For example, if two prioritized cells (41 and 42) are stored in the time slot 6, a chain whose beginning is the cell 41 and whose end is the cell 42 is generated as shown in FIG. 9. A linkage relationship of this chain is stored in the chain memory 27.

Figures 10A, 10B:
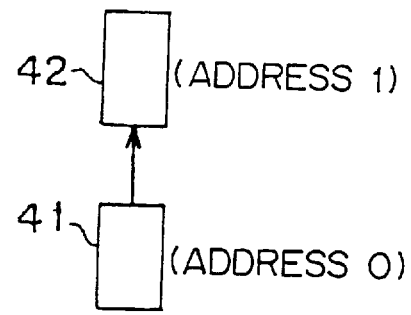
FIG. 10A shows an example of a data structure of a chain memory.
FIG. 10B shows an example of a chain.

FIG. 10A shows an example of a data structure of the chain memory 27. The chain memory 27 has the same address fields as those of the cell buffer 26. The chain memory 27 stores an address of a next cell linked to the cell written at the same address as that of the chain memory 27 in the cell buffer 26. Assuming that the cells 41 and 42 are respectively stored at the addresses 0 and 1 in the cell buffer 26 as shown in FIG. 10B, the contents of the chain memory 27 becomes that shown in FIG. 10A. Since the cell 42 follows the cell 41 in the chain, the address (address 1) at which the cell 42 is stored in the cell buffer 42 is stored at the address 0 of the chain memory 27. Since the cell 42 is the last cell of the chain, a "non", for example, is stored at the address 1 of the chain memory.

Described above is the example of the chain composed of two cells, which is generated in each slot according to a priority. If a chain is composed of two cells or more, the chain memory 27 sequentially points to storage addresses where the cells linked in the form of a chain in the cell buffer 26 are stored.

FIG. 9 and FIG. 10B show the examples of the states where the cells are linked in order to help the understanding of the concept of a chain. In reality, addresses of cells are sequentially pointed by the chain memory 27, as shown in FIG. 10A.

To the "Head" and the "Tail" arranged for each of the time slots in the prioritized cell entry memory 31 and the non-prioritized cell entry memory 32, addresses at which the first and the last cells of the chain generated for a corresponding time slot in the cell buffer 26, are respectively written. Assuming that the cells 41 and 42 are respectively stored at the addresses 0 and 1 in the cell buffer 26 in a similar manner as in the above described example, the address 0 is written to the "Head", and the address 1 is written to the "Tail" in the time slot 6 in the prioritized cell entry memory 31. If a chain generated according to a priority for a time slot is composed of one cell (such as a prioritized cell 43 stored in the time slot 16), an identical address (the address at which the prioritized cell is stored) is written to the "Head" and the "Tail".

An FLH register 33 and an FLT register 34 respectively store a first address and a last address of a chain where addresses in an empty area of the cell buffer 26 are linked. The linkage relationship of the chain generated by linking the addresses in the empty area of the cell buffer 26 is written to the chain buffer 27. The chain generated by linking addresses in an empty area of the cell buffer 26 is defined as a free list chain.

An OLH register 35 and an OLT register 36 respectively store a first address and a last address of a chain generated for a time slot corresponding to an output time (output list chain). For example, the address (address 0) at which the first cell (the cell 41) of the chain in the time slot 6 in the cell buffer 26 is written to the OLH register 35, and the address (address 1) at which the last cell (cell 42) of the chain is stored in the cell buffer 26 is written to the OLT register 36. This process is performed by writing the addresses stored in the "Head" and the "Tail" of the time slot 6 to the OLH register 35 and the OLT register 36 respectively.

If a prioritized cell and non-prioritized cells are stored in a single time slot like the time slot 3, the first and the last addresses of the chain of the prioritized cell are written to the OLH register 35 and the OLT register 36 respectively. After the process of reading these addresses is completed, the start and the last addresses of the chain of the non-prioritized cells are written to the OLH register 35 and the OLT register 36 respectively.

Provided next is the explanation about operations when a cell is input to the buffer 20 and written to the cell buffer 26, according to this embodiment.

If the cell is input to the buffer 20 via an input line, the VPI/VCI identification unit 21 retrieves a VPI/VCI of the cell, and informs the cell output time control unit 22 of the retrieved VPI/VCI. The cell output time control unit 22 retrieves a cell interval "T" corresponding to the VPI/VCI from the output time parameter table 23. The cell output time control unit 22 makes a comparison between an interval from an arrival time of a previously input cell having the same VPI/VCI as that of the above described input cell (the arrival time of the previously input cell) till an input time of the above described cell (current time), and the above described cell interval "T", as described above by referring to FIG. 8. If the cell interval "T" is longer, the difference between them (the delay time D) is transferred to the control unit 24 as output time information. If the cell interval "T" is shorter, this value is informed to the control unit 24.

The above described process is hereinafter explained based on the assumption that the cell interval "T" of a certain VPI/VCI corresponds to a duration of 5 time slots. Assume that a cell having an identical VPI/VCI is input at a time corresponding to the time slot 4 after a previously input cell is stored in the time slot 1. The actual cell interval in this case corresponds to a duration of 3 time slots, which is shorter than the cell interval "T" retrieved from the output time parameter table 23 by a duration of 2 time slots. Accordingly, the cell output time control unit 22 informs the control unit 24 of information indicating the duration corresponding to 2 time slots as the output time information (the delay time D).

When the control unit 24 receives the output time information, it delays a time when storing a cell by the duration corresponding to 2 time slots. That is, if an input cell is to be stored in the buffer 26 with no time delay, that cell is stored in the time slot 4. However, the cell undergoes a delay corresponding to 2 time slots according to the output time information. Therefore, it is stored in the time slot 6.

As described above, if the interval between two input cells is shorter than the cell interval "T" included in the output time parameter table 23, the cells are stored in a corresponding time slot so that the interval of reading these cells from the cell buffer 26 is equal to the cell interval "T". (the cells are linked to a chain of the corresponding time slot.

In the meantime, if a cell having the identical VPI/VCI is input at a time corresponding to the time slot 7 after the previously input cell is stored in the time slot 1, the actual interval between the cells is a duration corresponding to 6 time slots, which is longer than the cell interval "T" retrieved from the output time parameter table 23. Then, the cell output time control unit 22 notifies the control unit 24 of the fact that the actual interval is longer than the cell interval "T". The control unit 24 stores the input cell with no time delay in the time slot 7 upon receipt of this notification.

When the input cell is stored in the cell buffer 26 as described above, the tag identification information 25 references the CLP bit of the input cell, and notifies the control unit 24 of priority control information indicating that the cell is either a prioritized cell or a non-prioritized cell.

The control unit 24 rewrites the contents of the control memory 28 and the chain memory 27 according to the priority control information after it receives that information. If the input cell is a prioritized cell, the control unit 24 rewrites the contents of the prioritized cell entry memory 31. If the input cell is a non-prioritized cell, the control unit 24 rewrites the contents of the non-prioritized cell entry memory 32. The operations performed by the control unit 24 at this time are described hereinafter by referring to FIG. 11.

This figure shows examples of the chain memory 27 and the control memory 28 controlled by the control unit 24. In FIG. 11A, two prioritized cells whose expected output time corresponds to the time slot 4 are respectively stored at addresses 3 and 5, and linked as a chain. Additionally, one prioritized cell whose expected output time corresponds to the time slot 8 is stored at the address 1 in the cell buffer 26. Accordingly, the addresses 3 and 5 are respectively stored in the "Head" and the "Tail" of the time slot 4 in the prioritized cell entry memory 31. In both the "Head" and the "Tail" of the time slot 8, the address 1 is stored. The linkage relationship of the chain in the time slot 4 is stored by writing "the address 5" to the address 3 of the chain memory 27.

Currently, an empty area in the cell buffer 26 corresponds to addresses 9, 2, 7, and 6. These 4 addresses are linked as a chain and stored in the chain memory 27. The first address (address 9) and the last address (address 6) of the chain that indicate the empty area are stored in the FLH register 33 and the FLT register 34 respectively. In this state, if a prioritized cell is input to the buffer 20 and the control unit 24 determines that an expected output time of the prioritized cell corresponds to the time slot 4 according to the output time information notified by the cell output time control unit 22, it performs the following process. That is, the control unit 24 retrieves the first address (address 9) of the free list chain from the FLH register 33, and stores the prioritized cell at that address. At this time, the last address 9 is linked to the end of the chain corresponding to the time slot 4 as shown in FIG. 11B. That is, the control unit 24 rewrites the address 9 to the "Tail" of the time slot 4 in the prioritized cell entry memory 31, and writes the address 9 to the address 5 in the chain memory 27.

Since the first address linked to the free list chain is changed from the address 9 to the address 2, the control unit 24 writes the address 2 to the FLH register 33. After the above described process is completed, the control unit 24 waits for a next input cell.

Described above is the explanation about the case where cells are currently stored in a time slot to which another cell is attempted to be input. If the time slot stores no cells, the control unit 24 performs the following process.

Assume that a prioritized cell is input to the buffer 20 and an expected output time of that cell corresponds to the time slot 2 in FIG. 11A. The above described input prioritized cell is stored at the first address (address 9) of the free list chain. Then, the address 9 is written to the "Head" and the "Tail" of the time slot 2 in the prioritized cell entry memory 31, and the address 2 is written to the FLH register 33.

Figure 12:
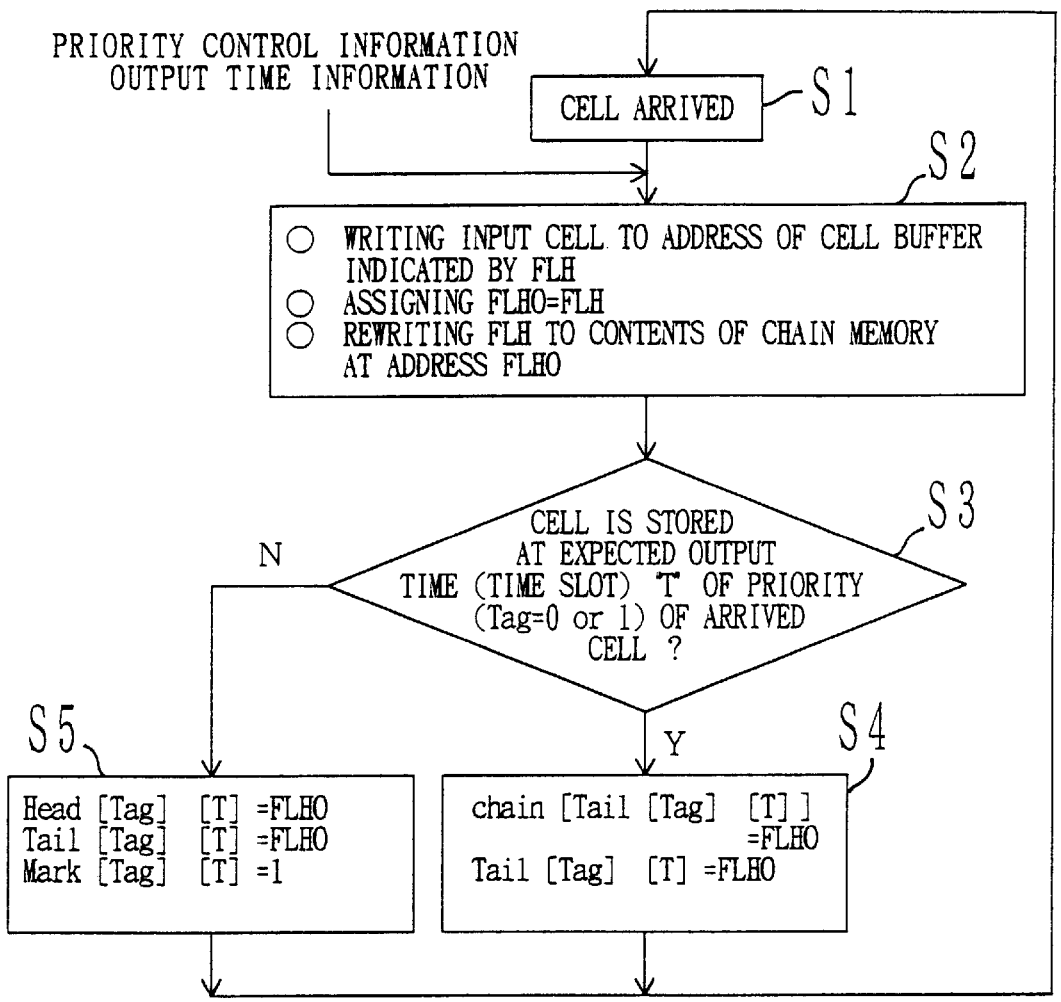
FIG. 12 is a flowchart showing operations performed by a control unit when writing a cell.

FIG. 12 is a flowchart showing the operations of writing a cell performed by the control unit 24.

If the cell is input to the buffer 20 in step S1, the cell output time control unit 22 and the tag identification unit 25 inform the control unit 24 of output time information and priority control information respectively.

The control unit 24 writes the input cell to an address (FLH0) in the cell buffer 26 indicated by the FLH register 33, searches the chain memory 27, and writes the contents of the address FLH0 (a next address linked to the address FLH0) in the chain memory 27 to the FLH register 33, in step S2.

In step S3, the control unit 24 references the output time information and the priority control information, and determines whether or not another cell whose priority (TAG) and expected output time (time slot T) are the same as those indicated by this information, is currently stored.

If it is determined that another cell is currently stored in this step, the control unit 24 links the above described address FLH0 to the end of the chain corresponding to the priority (TAG) and the expected output time (time slot T) in step S4. Additionally, the control unit 24 writes the address FLH0 to the "Tail" in the prioritized cell entry memory 31 or in the non-prioritized cell entry memory 32 corresponding to the priority (TAG) and the expected output time (time slot T).

If it is determined that the cell is not currently stored in step S3, the control unit 24 writes the address FLH0 to the "Head" and the "Tail" in the prioritized cell entry memory 31 or in the non-prioritized cell entry memory 32 corresponding to the priority (TAG) and the expected output time (time slot T), and writes "1" to the "Mark" in step S5. After the process of step S4 or step S5 is completed, the control unit 24 waits for a next cell input.

Provided next is the explanation about the operations of reading a cell from the cell buffer 26.

The control unit 24 reads cells corresponding to each time slot from the cell buffer 26 at intervals predetermined by a rate of transferring cells from the cell buffer 20, etc. That is, the control unit 24 sequentially references the contents of each time slot at predetermined intervals, and reads the cells according to the contents of each time slot.

Figures 13A, 13B:
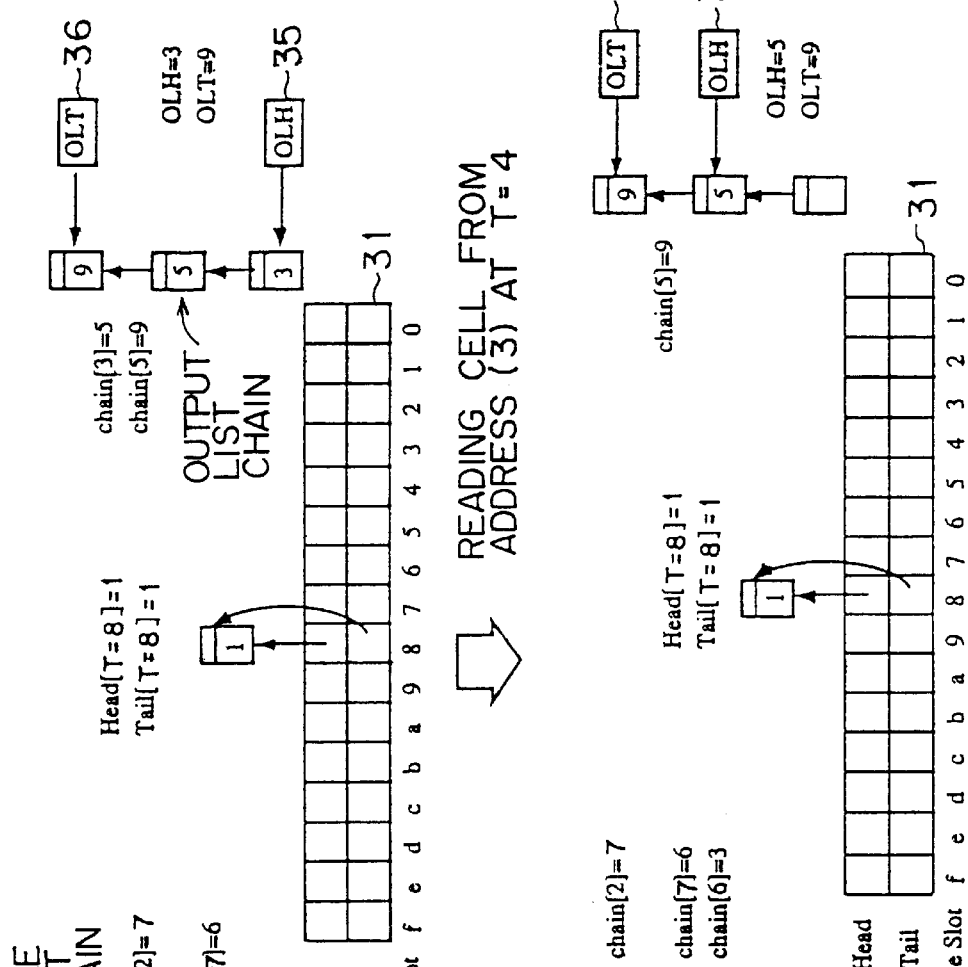
FIGS. 13A and 13B are schematics showing operations when reading a cell.

FIG. 13 shows examples of the chain memory 27 and the control memory 28 controlled by the control unit 24. FIG. 13A shows an example of controlling each memory when cells in the time slot 4 are read after the write process shown in FIG. 11 is completed.

If it is determined that the "Mark" is set to "1" in the time slot 4 in the prioritized cell entry memory 31, the control unit 24 specifies the chain corresponding to the time slot 4 as an output list chain, by writing the addresses stored in the "Head" and the "Tail" of the time slot 4 to the OLH register 35 and the OLT register 36 respectively. That is, the control unit 24 respectively writes the addresses 3 and 9 to the OLH register 35 and the OLT register 36.

Then, the control unit 24 retrieves the address from the OLH register 35, and reads the cell stored at that address from the cell buffer 26. That is, the control unit 24 reads the cell stored at the address 3 in the cell buffer 26.

The control unit 24 references the chain memory 27 using the address 3 as shown in FIG. 13B, identifies that the succeeding address linked to the address 3 is the address 5 in the output list chain, and writes the address 5 to the OLH register 35. Furthermore, the address 3 from which the above described cell is read becomes empty, and the control unit 24 links it to the end of a free list chain. That is, the control unit 24 writes the address 3 to the FLT register 34.

When the cells stored at the addresses 5 and 9 in the cell buffer 26 are read after the cell is read from the address 3 in the cell buffer 26 as described above, the address assigned to the OLH register 35 and the address assigned to the register 36 match (both become the address 9), and the process of reading the prioritized cells from the time slot 4 is completed. The addresses 5 and 9 are linked to the end of the free list chain at that time. After the process of reading the prioritized cells from the time slot 4 is completed, the process of reading the non-prioritized cells from the time slot 4 is performed. The process of reading the non-prioritized cells is the same as that of reading the prioritized cells. After these processes for the time slot 4 are completed, the reading processes for the succeeding time slots starting from 5 are performed in sequence.

FIG. 14 is a flowchart showing the operations of the process of reading cells performed by the control unit 24.

The control unit 24 sequentially searches for each time slot of the prioritized cell entry memory 31 and the non-prioritized cell entry memory 32, and it reaches a time when the control unit 24 reads information from a time slot "Tnow" in step S11. The time slot "Tnow" is a time slot from which cells are currently read.

In step S12, it is determined whether or not the "Mark" of the time slot "Tnow" in the prioritized cell entry memory 31 is 1. If the determined result in step S12 is "1", the prioritized cells are determined to be stored in the cell buffer 26 for the time slot "Tnow", and the process goes to step S13. If the determined result is "0", the prioritized cells are not determined to be stored in the cell buffer 26 for the time slot "Tnow", and the process goes to step S21.

In step S13, addresses stored in the "Head" and the "Tail" of the time slot "Tnow" for the prioritized cell entry memory 31 are written to the OLH register 35 and the OLT register 36 respectively. In step S14, the cell (prioritized cell) stored at the address included in the OLH register 35 is read from the cell buffer 26. In step S15, the address from which the cell is read is linked to the end of a free list chain. That is, the address included in the OLH register 35 is written to the FLT register 34.

In step S16, it is determined whether or not the addresses respectively stored in the OLH register 35 and the OLT register 36 match. If they do not match, the chain memory is referenced using the address stored in the OLH register 35 in step S17. Then, a next address linked to the address stored in the OLH register 35 is retrieved and written to the OLH register 35 in step S13. After step S17 is completed, the process goes back to step S14. Then, steps S14 through S17 are iterated until the addresses respectively stored in the OLH register 35 and the OLT register 36 match in step S15.

In step S16, if the addresses stored in the OLH register 35 and the OLT register 36 match, it is determined that all of prioritized cells in the time slot "Tnow" are read from the cell buffer 26. Then, the process goes to step S21 in order to start reading non-prioritized cells in the time slot "Tnow".

The process performed in steps S21 through S26 is basically the same as that performed in steps S12 through S17. The process performed in steps S12 through S17 accesses the prioritized cell entry memory 31, while the process performed in steps S21 through S26 accesses the non-prioritized cell entry memory 32.

Provided next is the explanation about the operations of forcibly discarding cells stored in the cell buffer 26.

If a size of an empty area in the cell buffer 26 is less than a predetermined threshold value, the buffer 20 according to the present invention forcibly discards specific non-prioritized cells among cells stored in the cell buffer 26 in order to prevent prioritized cells from being discarded. The most preferable threshold value for determining whether or not to forcibly discard non-prioritized cells can be calculated by a simulation, in consideration of the number of VPI/VCIs when a call is established, a cell transfer rate of each of the VPI/VCIs, a capacity of the cell buffer, etc.

FIG. 15 shows examples of the chain memory 27 and the control memory 28, which are controlled by the control unit 24.

The control unit 24 examines a size of an empty area in the cell buffer 26 by examining a free list chain. That is, the control unit 24 retrieves an address stored in the FLH register 33, and searches the chain memory 27 using the retrieved address, and counts the number of addresses linked to the free list chain. It registers the number of addresses, decrements that number each time a cell is written to the cell buffer 26, and increments that number each time the cell is read. Thus, the size of an empty area in the cell buffer 26 can be recognized at any time. If the threshold value for determining whether to forcibly discard cells is specified as "0", the size of an empty area can be recognized by whether or not the addresses stored in the FLH register 33 and the FLT register 34 match.

A forcible discard of non-prioritized cells can be implemented by linking a chain of non-prioritized cells stored in a time slot queue portion in the cell buffer 26 to a free list chain. The explanation about the operations of forcibly discarding the non-prioritized cells in the time slot 8 is hereinafter provided, referring to FIG. 15.

As shown in FIG. 15, only an address 2 is assumed to be an empty area of the cell buffer 26. Additionally, addresses 5 and 9 in the cell buffer 26 are assumed to store non-prioritized cells to be output to the time slot 8.

In this state, if the control unit 24 determines to forcibly discard the non-prioritized cells (a method for determining from which time slot the non-prioritized cells are discarded will be described later), the addresses (5 and 9) at which the non-prioritized cells are stored, are linked to the end of the free list chain (address 2).

Specifically, the last address (address 2) of the free list chain stored in the FLT register 34 is retrieved. The time slot 8 in the non-prioritized cell entry memory 32 is searched for, and the address (address 5) stored in the "Head" is further retrieved. Then, the address 5 is written to the address 2 in the chain memory 27. With this process, the addresses 2, 5, and 9 are sequentially linked in the free list chain. Since the last address of the free list chain is address 9 at this time, the address 9 is written to the FLT register 34.

Figures 15A, 15B:
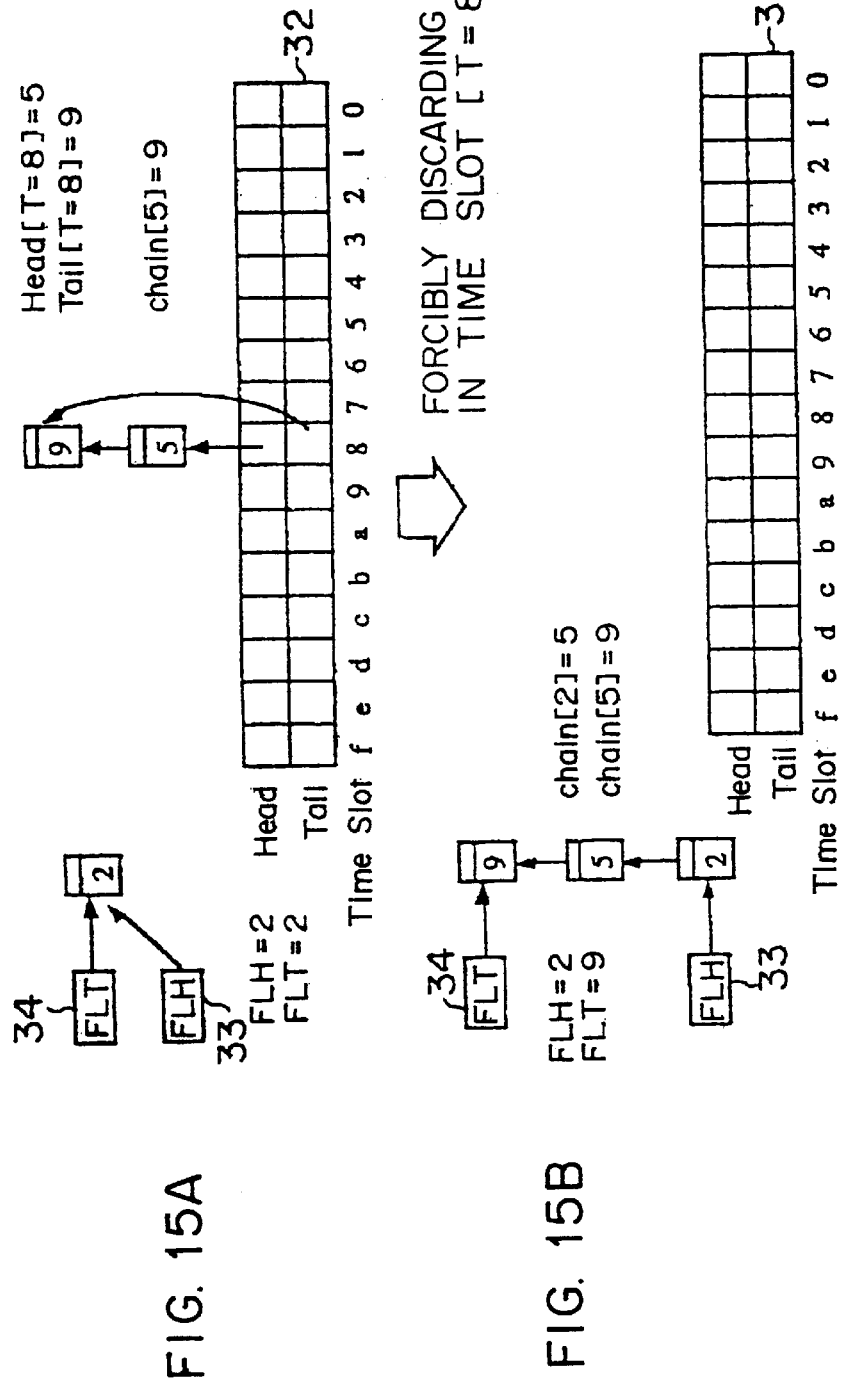
FIGS. 15A and 15B are schematics showing operations of forcibly discarding cells.

According to the above described process, the chain memory 27 and the control memory 28 become in the states shown in FIG. 15B. The "Mark" of the time slot 8 in the non-prioritized cell entry memory 32 is rewritten to "0" when the above described cell discarding process is performed, though this is not shown in the attached drawings.

Thus, once the addresses 5 and 9 are unlinked from the chain in the time slot queue portion and linked to the free list chain, the cells stored at these addresses are never read.

As described above, the process of discarding the non-prioritized cells stored at the addresses 5 and 9 in the cell buffer 26 can be implemented only by rewriting the contents of the chain memory 27, control memory 28, and FLT register 34. If cells are input to the buffer 20 after that, they are written to the addresses 2, 5, 9 in sequence. Although these addresses continuously store discarded cells (cells which are not read) at that time, the newly input cells are overwritten to the addresses so that they are stored in the cell buffer 26.

Provided below is the explanation about a method for determining from which time slot non-prioritized cells are discarded.

Figure 18:
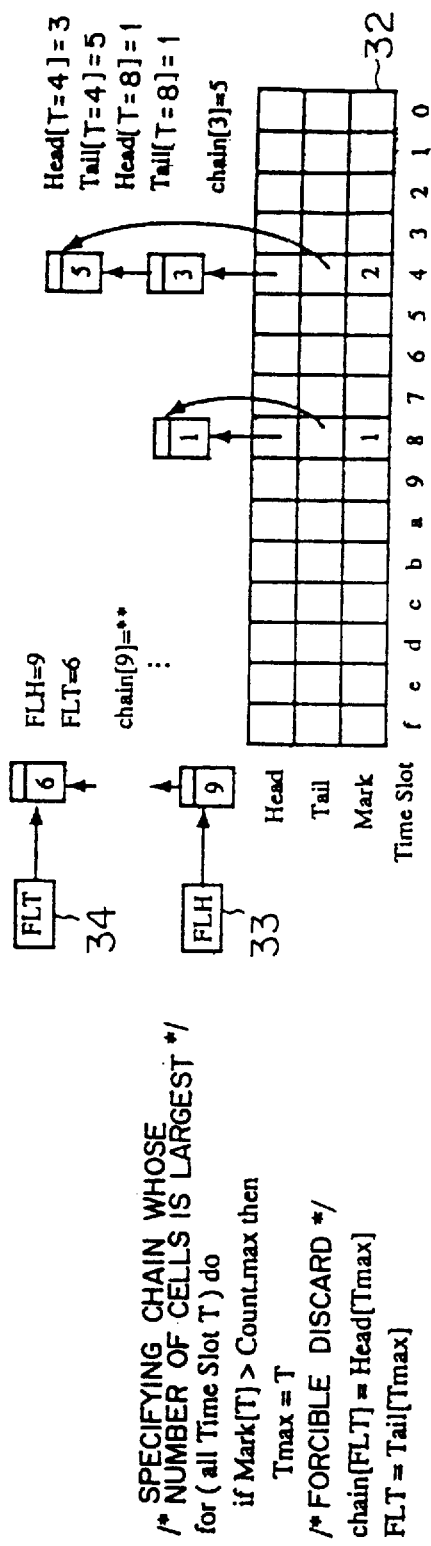
FIG. 18 shows an example of another method for forcibly discarding cells from the time slot whose number of cells is the largest.

FIGS. 16 through 18 show a process of forcibly discarding non-prioritized cells from a time slot whose number of non-prioritized cells is the largest.

FIG. 16A shows an example of controlling the chain memory 27 and the control memory 28 when the number of cells stored in a time slot "T" is counted. In this figure, an address (address 3) stored in a "Head" of the time slot "T" in the non-prioritized cell entry memory 32 is retrieved. Then, the chain memory 27 is accessed using the retrieved address, and addresses linked as a chain are sequentially retrieved. Each time one of the addresses is retrieved, a count value of the number of cells is incremented. The count value when the address retrieved from the chain memory 27 matches the address stored in the "Tail" of the time slot T is defined as the number of cells stored in the time slot "T".

FIG. 16B shows an example of a pseudo-code program of the above described process. This pseudo-code program describes that the number of cells stored in an arbitrary time slot is counted. Actually, the number of non-prioritized cells stored in the arbitrary time slot is counted. In this case, the above described process is performed for a chain of non-prioritized cells.

FIG. 17 shows a process of discarding cells from a time slot whose number of cells is the largest after the process of examining the number of cells of each time slot shown in FIG. 16 is performed. FIG. 17A shows an example of a pseudo-code program which describes the process of discarding cells stored in a specified time slot whose number of cells is the largest. FIG. 17B shows an example of a pseudo-code program which describes a process of discarding cells stored in a time slot, when a "Head" and a "Tail" of that time slot whose number of cells is the largest are specified.

FIG. 18 shows an example of another method for forcibly discarding non-prioritized cells from a time slot storing the largest number of non-prioritized cells. In the non-prioritized cell entry memory 32 shown in this figure, the number of cells can be written to a "Mark" of each time slot. That is, according to this method, some bits, for example, are assigned for the "Mark" area. Each time a cell is written to one of the time slots, the value of the "Mark" of that time slot is incremented. When a cell of the time slot is read or discarded, the value of the "Mark" of the time slot is reset to 0.

With this method, it can be quickly determined which time slot stores the largest number of non-prioritized cells by examining the value of the "Mark" of each time slot.

As described above, the method for forcibly discarding non-prioritized cells from a time slot storing the largest number of non-prioritized cells can free up a large empty area of the cell buffer 26 at one time.

In contrast with the above described method, a method for forcibly discarding non-prioritized cells from a time slot storing the smallest number of non-prioritized cells (excluding a case of the number "0") may be adopted. In this case, the basic procedure is the same as that described by referring to FIGS. 16 through 18. However, the first portion of the pseudo-code program shown in FIG. 17, for example, must be rewritten as follows:

/*specifies a chain storing the smallest number of cells*/if
   Count<Count.max then As described above, the method for forcibly discarding the non-prioritized cells from a time slot storing the smallest number of non-prioritized cells can reduce the number of cells to be discarded.

FIG. 19 shows schematics showing a process of forcibly discarding non-prioritized cells from a time slot whose time is farthest from a current time.

Figure 19A:
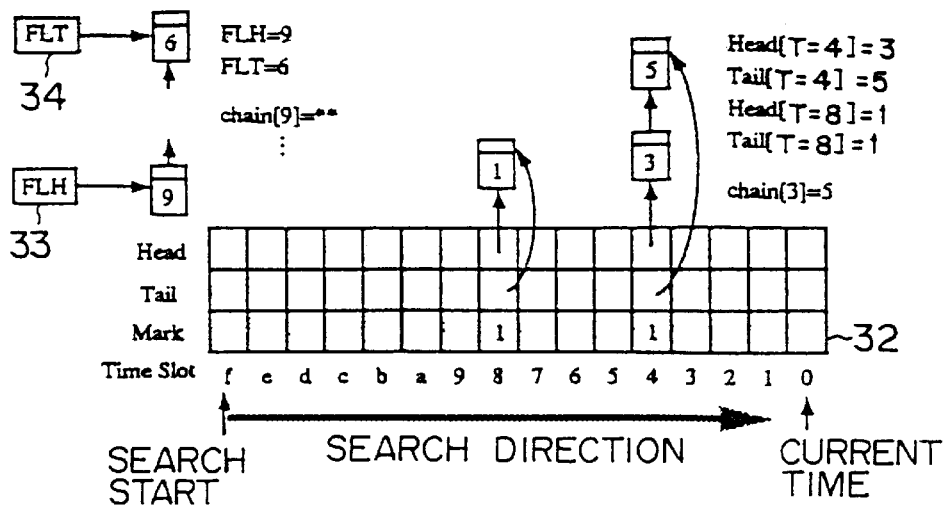
FIGS. 19A and 19B are schematics showing a process of forcibly discarding non-prioritized cells from a time slot farthest from a current time.

Assume that the current time is the time of reading cells from the time slot 0 (the process of reading cells from the time slot 0 is currently performed) in a state that non-prioritized cells are stored in the time slots 4 and 8 as shown in FIG. 19A. The control unit 24 starts searching for a time slot "f" whose time is the farthest from the time slot 0. This search is a process of searching for time slots (time slots storing non-prioritized cells) whose "Mark" is set to 1 in the non-prioritized cell entry memory 32. The search is performed in a direction from f to 0 in sequence. Since the time slot farthest from the time slot 0 among the time slots whose "Mark" is set to "1" is the time slot 8 in FIG. 19A, the non-prioritized cells stored in the time slot 8 are discarded.

Figure 19B:
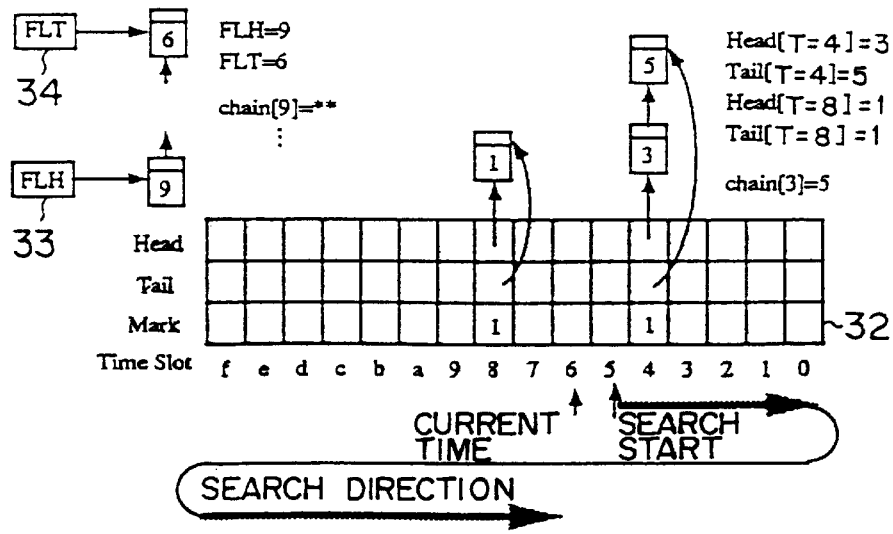

FIG. 19B shows a case where the current time is a read time for the time slot 6. Since the process of reading cells is performed from the time slot 6 in this case, the time slot 5 is the time slot farthest from the current time. Accordingly, the non-prioritized cells stored in the time slot 4 are forcibly discarded. This is because the above described search is performed in a direction from the time slot 5.

FIG. 20 shows an example of a pseudo-code program which describes the above described process of forcibly discarding cells.

As described above, the method for forcibly discarding non-prioritized cells from a time slot farthest from the current time can discard non-prioritized cells with a large amount of delay time.

FIG. 21 shows a process of forcibly discarding non-prioritized cells stored in a time slot closest to the current time.

Figure 21A:
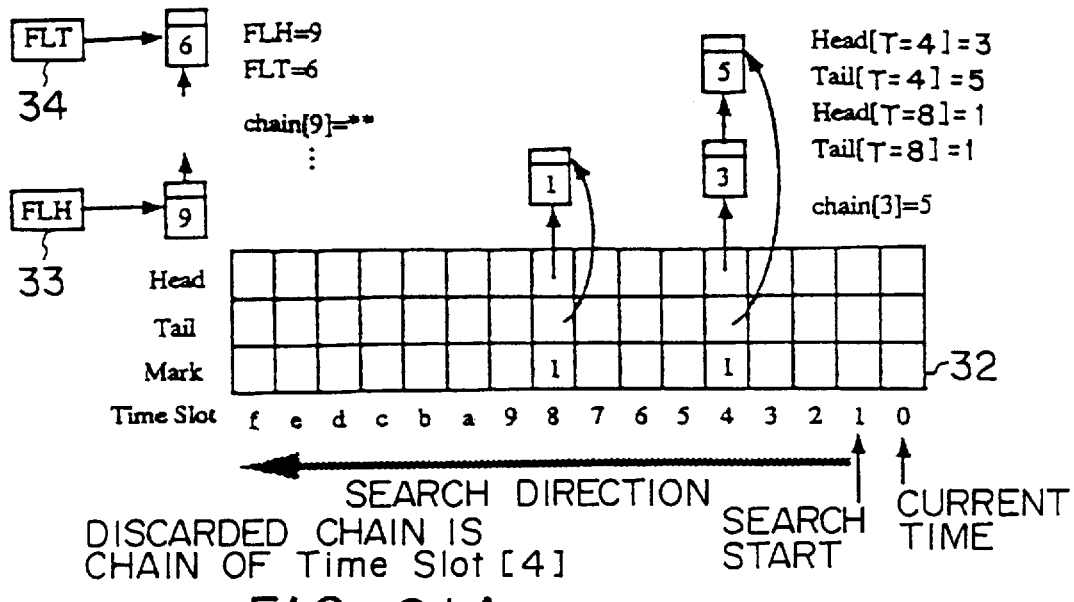
FIGS. 21A and 21B are schematics showing a process of forcibly discarding non-prioritized cells from a time slot closest to a current time.

Assume that the non-prioritized cells are stored in the time slots 4 and 8, and the current time is a read time for the time slot 0 as shown in FIG. 21A. The control unit 24 sequentially searches for the time slots in a direction from the time slot 1 nearest to the time slot 0. Since the time slot farthest from the time slot 0 among the time slots whose "Mark" is set to "1" is the time slot 4, the non-prioritized cells stored in the time slot 4 are discarded.

Figure 21B:
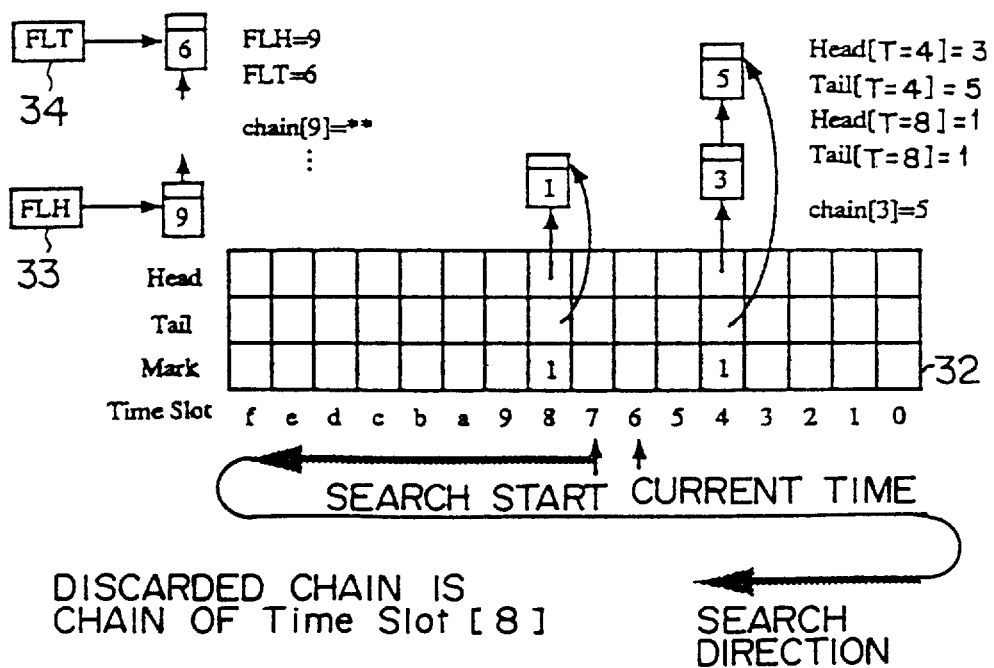

FIG. 21B shows a case where the current time is a read time for the time slot 6. Since the above described search is started from the time slot 7 in this case, the non-prioritized cells stored in the time slot 8 are forcibly discarded.

FIG. 22 shows an example of a pseudo-code program which describes the above described process of forcibly discarding cells.

With the above described method for forcibly discarding non-prioritized cells stored in a time slot closest to the current time, the possibility of storing a larger number of cells is statistically greater as the time slot is closer to the current time, thereby reducing an amount of search time.

Figure 23:
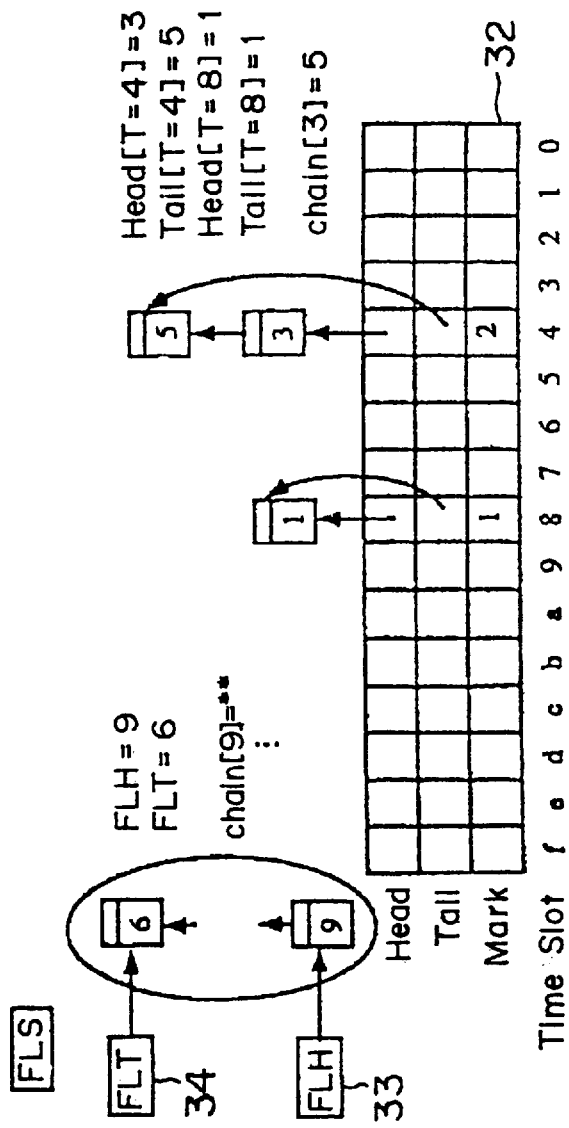
FIG. 23 shows a process of continuing to forcibly discard non-prioritized cells until a size of an empty area in a cell buffer is equal to or larger a predetermined value.

FIG. 23 shows an iterative process of forcibly discarding non-prioritized cells until a size of an empty area is equal to or greater than a predetermined value.

In this process, it is required to obtain the size of an empty area (FLS: Free List Size) in the cell buffer 26. The size of the empty area in the cell buffer 26 is obtained by, for example, searching the chain memory 27, and counting a length of a chain from the address stored in the FLH register 33 up to the address stored in the FLT register 34 (the number of linked addresses) stored in the FLT register 34, as described by referring to FIG. 16.

Otherwise, a counter for counting a number indicating the size of an empty area "FLS" may be arranged, and the number of cells stored in a time slot (the number of non-prioritized cells) may be written to a "Mark" of each time slot in a similar manner as in FIG. 18. In this case, each time a cell is written to the cell buffer 26, the counter is decremented. The counter is incremented each time a cell is read from the cell buffer 26. If a cell stored in a time slot "Tsearch" is discarded, the value stored in the "Mark" of the time slot "Tsearch" is added to the count value of the above described counter. Then, the size of the empty area in the cell buffer 26 is obtained according to the resultant count value.

Instead of the method for storing the number of cells in each time slot in a "Mark", the number of cells stored in each slot may be obtained with a method similar to the one shown in FIG. 16.

The control unit 24 obtains the size of an empty area (FLS) in the cell buffer 26 as described above, and executes a pseudo-code program shown in FIG. 24. In this pseudo-code program, a "TH" is a threshold value. If the size of an empty area "FLS" is less than the threshold value "TH", the process of forcibly discarding cells is continued.

Figure 25:
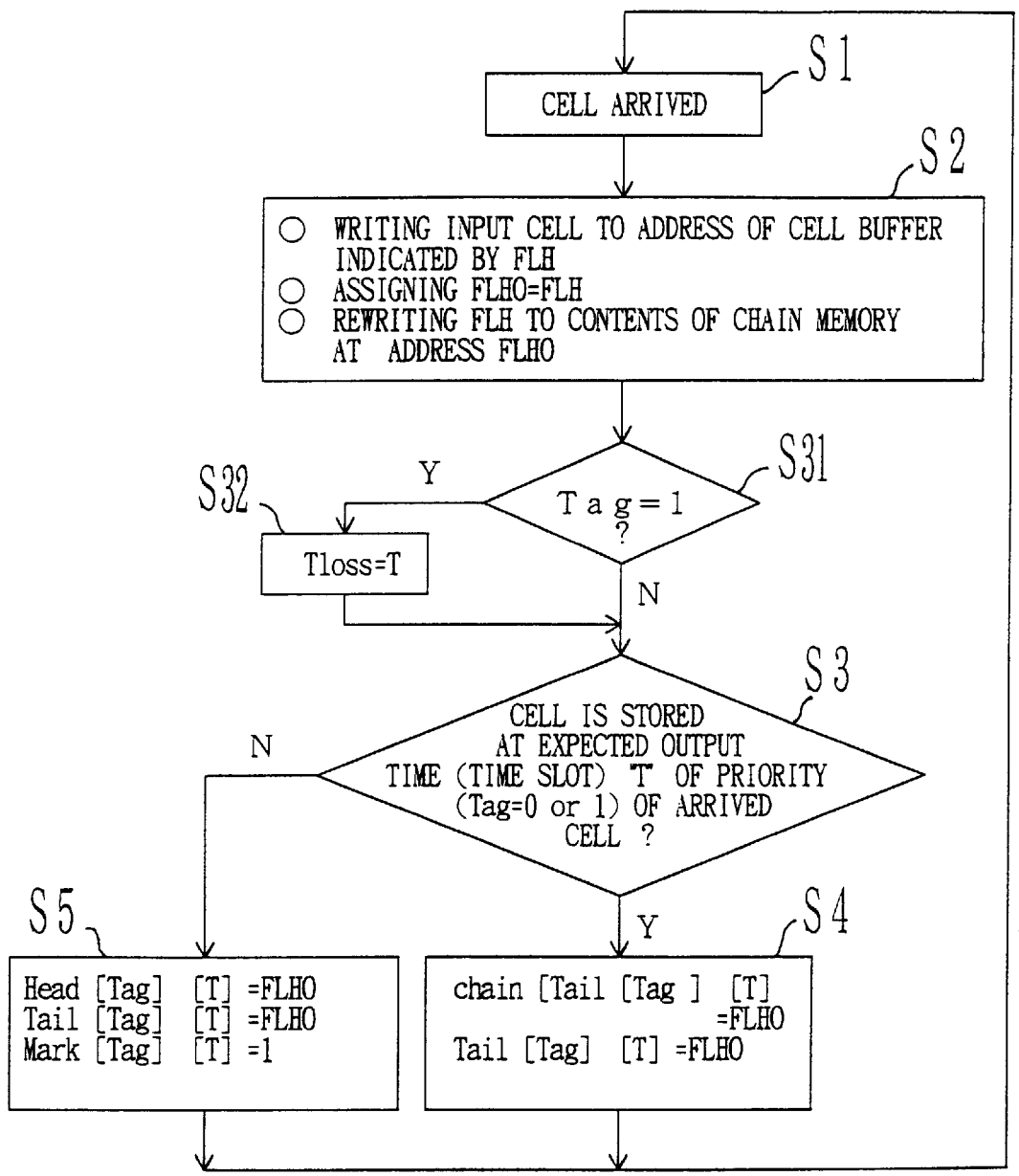
FIG. 25 is a flowchart showing a process of forcibly discarding non-prioritized cells stored in a time slot to which a non-prioritized cell is last written.

FIG. 25 is a flowchart showing a process of forcibly discarding non-prioritized cells stored in a time slot to which a non-prioritized cell is last written. The flowchart in this figure shows a process of writing a cell to the cell buffer 26, and the same step numbers are given to the same processes as those of FIG. 12. This method provides additional steps S31 and S32 succeeding step S2 in order to store the time slot to which the non-prioritized cell is last written.

In step S31, it is determined whether a CLP bit (Tag) of an input cell is either a prioritized cell (Tag=0) or a non-prioritized cell (Tag=1). If it is determined to be the prioritized cell, the process goes to step S3. Otherwise, the process goes to step S32 where a time slot to which the input cell is written is registered as a time slot "Tloss". Then, the process goes to step S3.

If the size of an empty area in the cell buffer 26 is smaller than the predetermined threshold value, for example, and there may arise a need for forcibly discarding non-prioritized cells stored in the cell buffer 26, the non-prioritized cells in the time slot "Tloss" registered as described above are discarded.

The above described method for forcibly discarding non-prioritized cells stored in a time slot to which the non-prioritized cell is last written, eliminates the need of determining from which time slot non-prioritized cell are discarded, thereby reducing an amount of time required for discarding cells.

Figure 26:
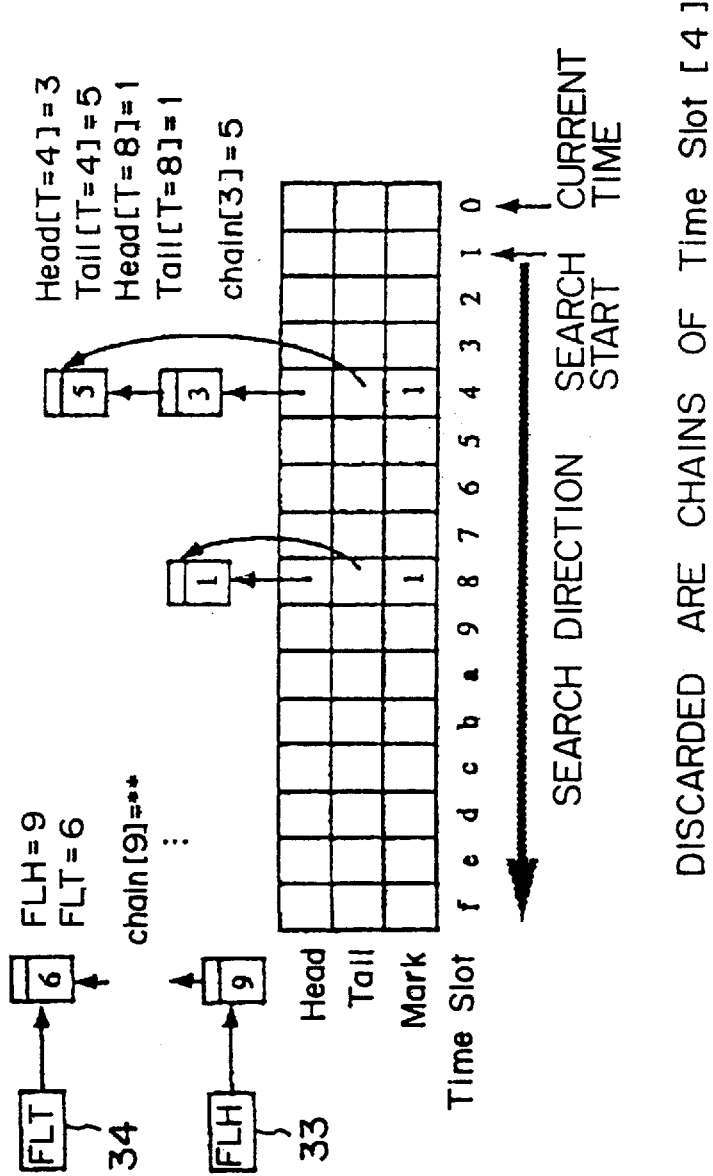
FIG. 26 is a schematic showing a process of forcibly discarding all of the non-prioritized cells.

FIG. 26 shows an example of a process of forcibly discarding all of the non-prioritized cells.

In this process, the control unit 24 searches a "Mark" of all of time slots in the non-prioritized cell entry memory 32, and retrieves the time slots whose value of the "Mark" is set to "1". Then, the control unit 24 links a chain of non-prioritized cells stored in each of the retrieved time slots to a free list chain. The method for linking the chain of each of the time slots to the free list chain is the same as that described by referring to FIG. 15. FIG. 27 shows an example of a pseudo-code program which describes a process of forcibly discarding all of the non-prioritized cells.

As described above, the method for forcibly discarding all of the non-prioritized cells can free up a large space of an empty area in the cell buffer 26 at one time.

Figure 28:
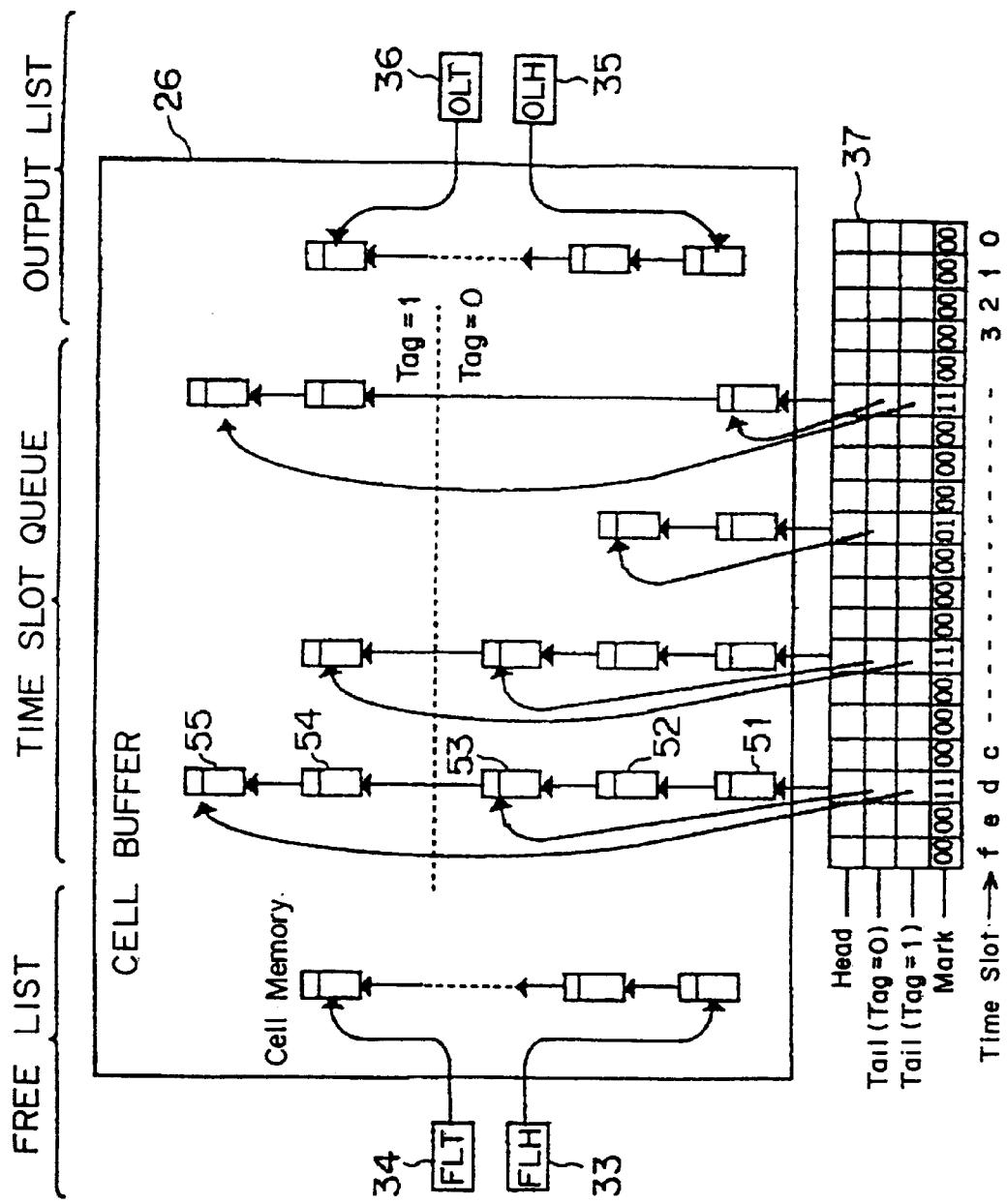
FIG. 28 shows a variation of the first embodiment.

FIG. 28 shows an example of a variation of the buffer 20 according to the first embodiment. In this figure, the reference numerals the same as those in FIG. 9 indicate the same portions. The configuration shown in FIG. 28 adopts an entry memory 37 instead of the prioritized cell entry memory 31 and the non-prioritized cell entry memory 32 adopted in FIG. 9.

With the configuration of this embodiment, prioritized cells and non-prioritized cells are linked as one chain for each time slot. In this case, addresses of the cell buffer 26 storing the prioritized cells are sequentially linked from the beginning of each chain, and addresses of the cell buffer 26 storing the non-prioritized cells are linked after the addresses of the prioritized cells.

The entry memory 37 includes the following areas for each time slot. That is, a "Head" includes an address storing the first prioritized cell of a chain in a corresponding time slot. A "Tail(Tag=0)" includes an address storing the last prioritized cell among the prioritized cells linked in the chain. A "Tail (Tag=1)" includes an address storing the last non-prioritized cell among the non-prioritized cells linked in the chain. A "Mark" indicates whether or not cells are stored in the corresponding time slot. The "Mark" is 2-bit information indicating one of the following meanings.

"00" A corresponding time slot includes no cells.

"01" The corresponding time slot includes one or a plurality of prioritized cells.

"10" The corresponding time slot includes one or a plurality of non-prioritized cells.

"11" The corresponding time slot includes one or a plurality of respective prioritized cells and non-prioritized cells.

As is evident from the above description, the low-order bit of the "Mark" indicates existence/non-existence of the prioritized cell(s), and the high-order bit of the "Mark" indicates existence/non-existence of the non-prioritized cell(s).

The explanation about a relationship between a setting of the entry memory 37 and the chain memory 27 is specifically provided below. In FIG. 28, the time slot "d" includes the prioritized cells 51 through 53 and the non-prioritized cells 54 and 55. In this case, a chain is generated in the order of the prioritized cells 51 through 53 and the non-prioritized cells 54 and 55 in the chain memory 27. That is, as described above by referring to FIG. 10, in the chain memory 27, the prioritized cell 52 is first linked to the prioritized cell 51 by writing the address storing the prioritized cell 52 in the cell buffer 26 to the same address of the cell buffer 26 storing the prioritized cell 51, in the cell buffer 26. Similarly, the prioritized cells 52 and 53 and the non-prioritized cells 54 and 55 are linked in sequence.

In the entry memory 37, the address storing the prioritized cell 51 is written to the "Head", the address storing the prioritized cell 53 is written to the "Tail (Tag=0), and the address storing the non-prioritized cell 55 is written to the "Tail(Tag=1)". Since the time slot "d" includes both the prioritized cells and non-prioritized cells, the value "11" is assigned to the "Mark".

Provided next is the explanation about the operations when a cell is input to the buffer configured as shown in FIG. 28, by referring to FIGS. 29 and 30.

FIG. 29A shows a state where four prioritized cells are stored in a certain time slot. These four prioritized cells are respectively stored at the addresses 1 through 4 in the cell buffer 26 in this figure.

If a non-prioritized cell output to the time slot is written to the address 10 in the cell buffer 26 in this state, the address 4 points to the address 10 in the chain memory 27 as shown in FIG. 29B (the address 10 is written to the address 4 in the chain memory 27). In addition, the address 10 is written to the "Tail(Tag=1)" in the entry memory 37. The high-order bit of the "Mark" is then set to "1" (indicated as "Mark1=1" in FIG. 29B).

After the prioritized cell output to the time slot is written to the address 5 in the cell buffer 26, this address is linked to the address 4 which is the last address among the prioritized cells. That is, the address 5 is linked between the address 4 and the address 10. At this time, the "Tail(Tag=0)" indicating the end of the prioritized cells is rewritten from the address 4 to the address 5.

FIG. 30A shows a state where four non-prioritized cells are stored in a time slot. These four non-prioritized cells are respectively stored at the addresses 1 through 4 in the cell buffer 26.

If a prioritized cell output to the time slot is written to the address 10 in this state, the address 10 points to the address 1 in the chain memory 27 as shown in FIG. 30B (the address 1 is written to the address 10 in the chain memory 27). In addition, the address 10 is written to the "Head" and the "Tail(Tag=0)" in the entry memory 37. Then, the low-order bit of the "Mark" is set to "1" (indicated as Mark0=1 in this figure).

After the prioritized cell output to the time slot is written to the address 20 in the cell buffer 26, the address 20 is linked to the address 10 which is the last address among the prioritized cells as shown in FIG. 30C. That is, the address 20 is linked between the address 10 and the address 1. At this time, the "Tail(Tag=0)" indicating the end of the prioritized cells is rewritten from the address 10 to the address 20.

As described above, if a prioritized cell is input, it is linked to a chain prior to non-prioritized cells previously stored in a time slot.

FIG. 31 is a flowchart showing the operations of a process of reading cells performed by the control unit 24 in the buffer configured as shown in FIG. 28.

The control unit 24 sequentially searches for time slots in the entry memory 37. When it reaches a time to read information from a time slot "Tnow" in step S41, it is determined what type of cell is read from the cell buffer 26 by examining the "Mark" of the time slot "Tnow" in step S42. That is, it is determined whether or not all of the cells to be read from the time slot "Tnow" are prioritized cells, or whether or not some of the cells to be read are non-prioritized cells. If the "Mark" of the time slot "Tnow" is "01", it is determined that the time slot "Tnow" stores the prioritized cells only. The process therefore goes to step S43. If the "Mark" of the time slot "Tnow" is "10" or "11", it is determined that the time slot "Tnow" includes at least one non-prioritized cell. The process goes to step S44 in this case. If the "Mark" of the time slot "Tnow" is "00", it is determined that there is no cell to be read from the time slot "Tnow". As a result, the process shown in this flowchart is completed.

In step S43, the address stored in the "Head" of the time slot "Tnow" is written to the OLH register 35, and the address stored in the "Tail(Tag=0)" is written to the OLT register 36. In the meantime, the address stored in the "Head" of the time slot "Tnow" is written to the OLH register 35 and the address stored in the "Tail(Tag=1) is written to the OLT register 36 in step S44. By performing the process of step S43 or step S44, the chain of the cells output to the time slot "Tnow" is stored in the OLH register 35 and the OLT register 36 as an output list chain.

In step S45, the cells are read from the cell buffer 26 using the address stored in the OLH register 35. In step S46, the address from which the cell is read in step S45 is linked to the end of the free list chain. That is, the address stored in the OLH register 35 is written to the FLT register 34.

In step S47, it is determined whether or not the addresses respectively stored in the OLH register and the OLT register 36 match. In this step, if these two addresses match, it is determined that all of the cells stored in the time slot "Tnow" are read. Then, the process goes back to step S41, and waits for processing of a next time slot. If they do not match, it is determined that there remain cells to be read in the time slot "Tnow". Then, the process goes to step S48.

In step S48, the chain memory 27 is searched, a next address linked to the address used in step S45 is retrieved, and the retrieved address is written to the OLH register 35. Then, the process goes back to step S45. steps S45 through S48 are iterated until both of the addresses match, that is, all of the cells stored in the time slot "Tnow" are read in step S47.

According to the configuration shown in FIG. 28, the prioritized cell entry memory 31 and the non-prioritized cell entry memory 32 are implemented by one entry memory 37, thereby reducing an amount of the memory. Specifically, the area for storing the "Head" in the non-prioritized cell entry memory 32 is no longer required in the entry memory 37.

With the configuration shown in FIG. 28, all of the cells stored in each time slot are linked as one chain. Accordingly, the process of storing the chain of the time slot in an output list chain at the time of reading the time slot can be performed at the same time, thereby enabling that process to be performed in a shorter amount of time.

FIG. 32 shows an example of applying the buffer according to the present invention.

Figure 32A:
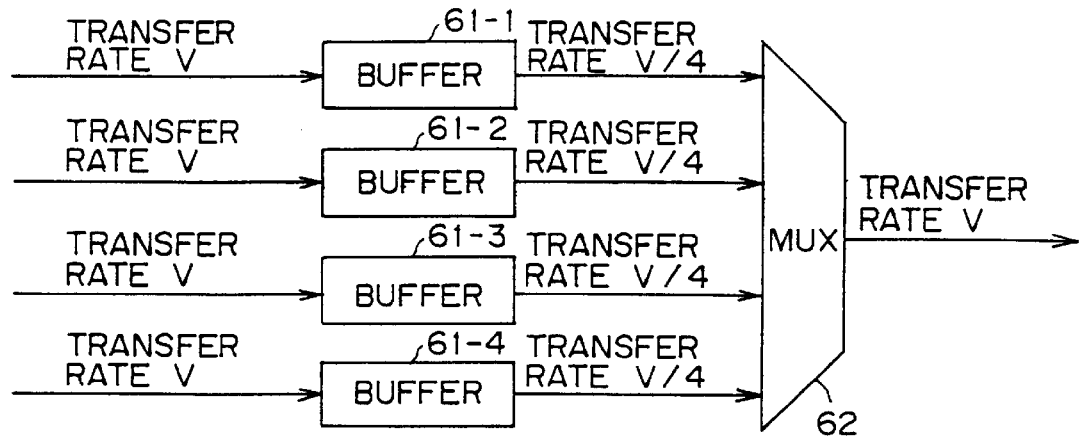
FIGS. 32A, 32B, and 32C show variations of the buffer according to the present invention.

In FIG. 32A, the buffers 61-1 through 61-4 simultaneously store cells input from input lines whose cell transfer rate is "V", read the cells so that the cell transfer rate is equal to V/4, and output the read cells to the multiplexer MUX 62. The buffers 61-1 through 61-4 are implemented by the buffer 20 shown in FIG. 7, and configured, for example, as shown in FIG. 9 or FIG. 28. The multiplexer MUX 62 multiplexes the cells output from the buffers 61-1 through 61-4.

With this configuration, when four input lines whose transfer rate is "V" (for example, 622 Mbps) are multiplexed, the buffers 61-1 through 61-4 perform a shaping process. If it is not avoidable to discard cells due to a concentration of cells at a certain timing, non-prioritized cells are forcibly discarded from the buffers 61-1 through 61-4 in order to assure a quality of the prioritized cells. Accordingly, it can be avoided to discard the cells in the multiplexer MUX 62 or in a unit succeeding the multiplexer MUX, so that the buffers 61-1 through 61-4 can manage the quality of cells.

Figure 32B:
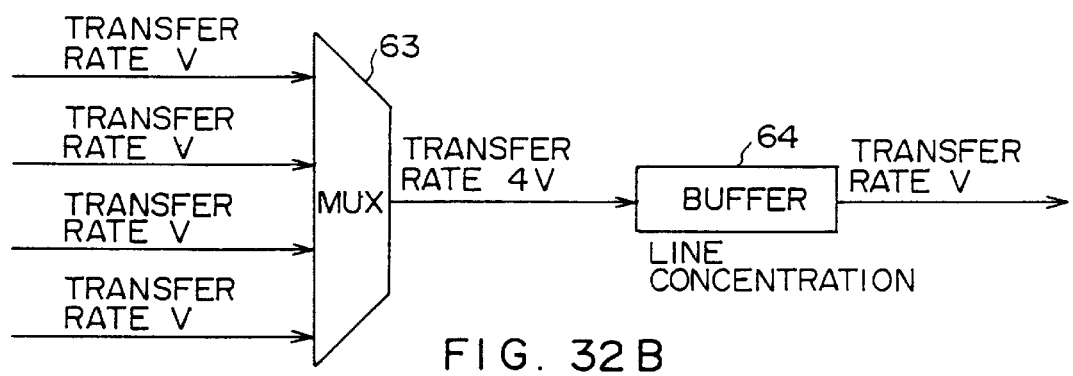

FIG. 32B shows an example of arranging a buffer succeeding a multiplexer. That is, cells input via four input lines whose transfer rate is "V" are multiplexed by a multiplexer MUX 63, and the resultant output is output to the buffer 64. The transfer rate of an output from the multiplexer MUX 63 is "4V". The buffer 64 stores cells output from the multiplexer MUX 63, and reads them so that the transfer rate can be "V". The buffer 64 is implemented by the buffer 20 shown in FIG. 7, and configured, for example, as shown in FIG. 9 or FIG. 28.

Figure 32C:
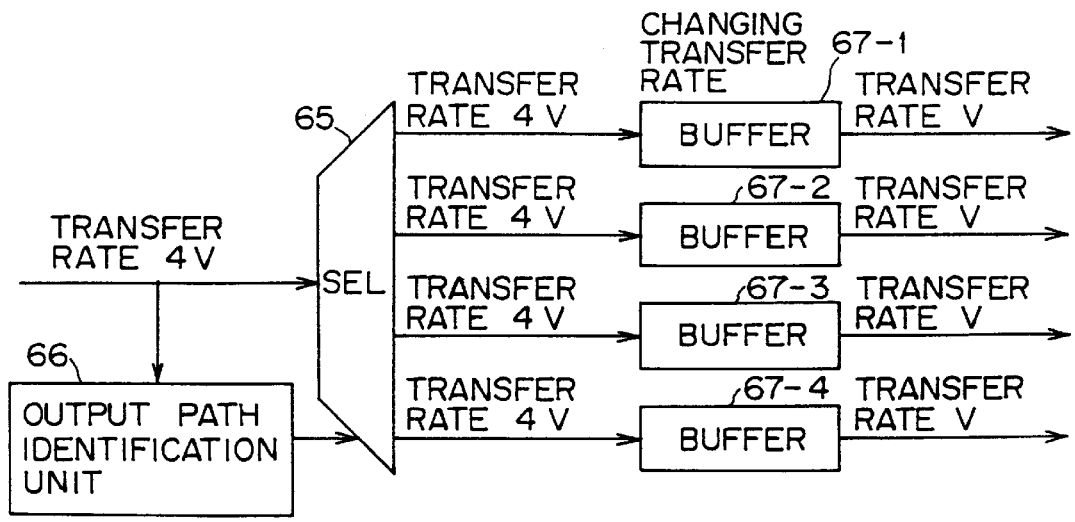

FIG. 32C shows an example of arranging the buffer according to the present invention in a distributor (demultiplexer). In this figure, if a cell is input to a selector SEL 65 from an input line whose transfer rate is 4V, the selector SEL 65 transfers the cell to any of predetermined buffers 67-1 through 67-4 according to an instruction given by an output path identification unit 66. The output path identification unit 66 extracts a header of the cell input to the selector SEL 65, retrieves information indicating to which of the buffers 67-1 through 67-4 the cell must be transmitted, and notifies the selector SEL 65 of the retrieved information. The transfer rate of each of the outputs from the selector SEL 65 is 4V respectively.

The buffers 67-1 through 67-4 once store the cells transferred from the selector SEL 65, and read them so that the transfer rate can be "V". The buffers 67-1 through 67-4 are respectively implemented by the buffer 20 show in FIG. 7, and configured, for example, as shown in FIG. 9 or FIG. 28.

According to this configuration, to divide a highway whose transfer rate is 4V (2.4 Gbps, for example) into four paths, the buffers 67-1 through 67-4 perform a shaping process. If it is unavoidable to discard cells while shaping, non-prioritized cells are forcibly discarded in order to assure the quality of prioritized cells. Accordingly, it can be avoided to discard cells in a succeeding unit, and the quality of cells can be managed by the buffers 67-1 through 67-4.

Figure 33:
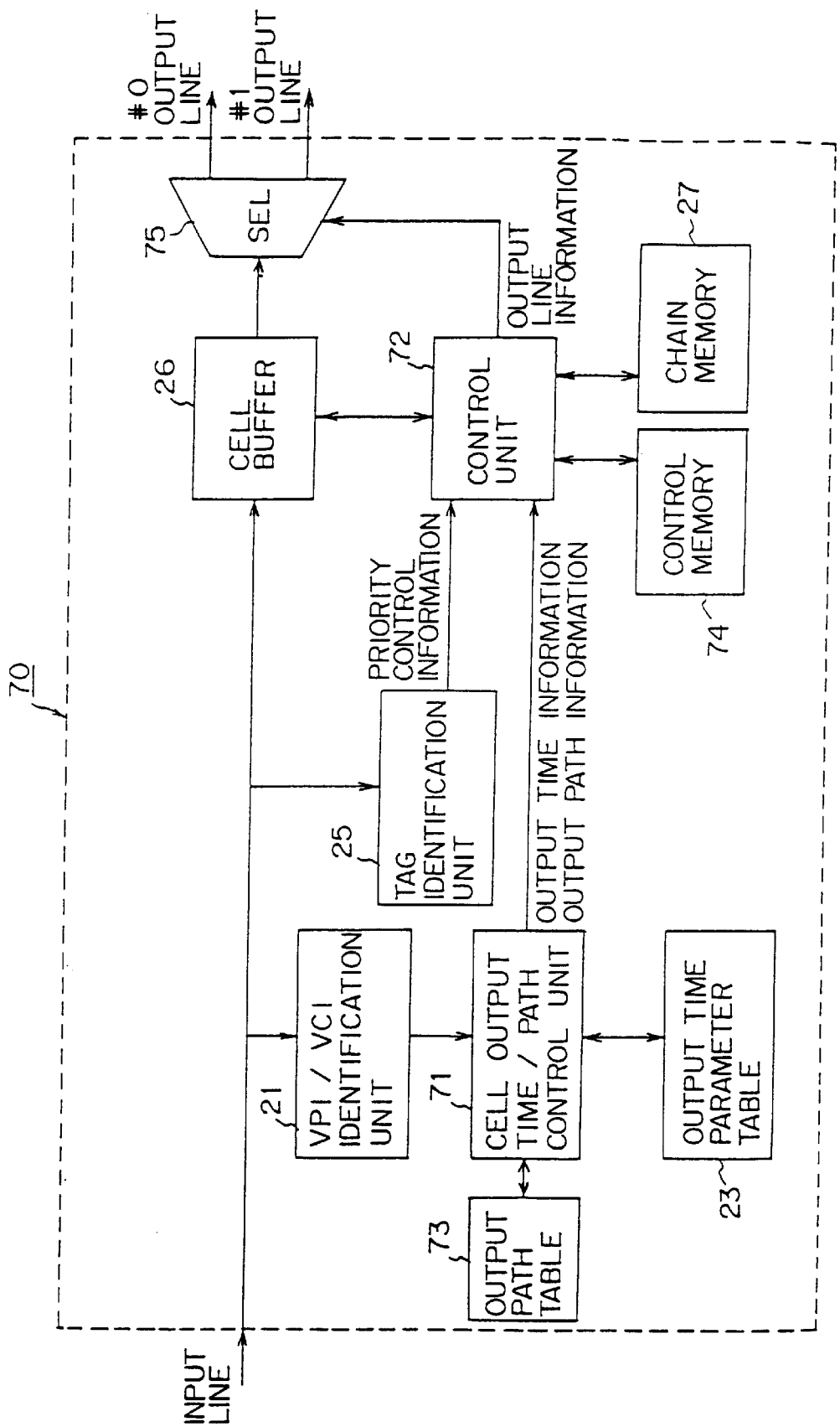
FIG. 33 is a functional block diagram of a buffer according to the second embodiment of the present invention.

FIG. 33 is a functional block diagram of the buffer according to the second embodiment of the present invention. A buffer 70 shown in this figure performs a priority control process and a shaping process for a cell input from an input line, and outputs it to a predetermined path among a plurality of output lines. In this figure, the same reference numerals as those used in FIG. 7 indicate the same portions. That is, the VPI/VCI identification unit 21, the output time parameter table 23, the tag identification unit 25, the cell buffer 26, and the chain memory 27 are the same components as shown in FIG. 7.

A cell output time/path control unit 71 searches an output time parameter table using VPI/VCI information received from the VPI/VCI identification unit 21, retrieves output time information, and transfers the retrieved information to a control unit 72. It also searches an output path table 73, retrieves output path information, and transfers the retrieved information to the control unit 72.

Figure 34:
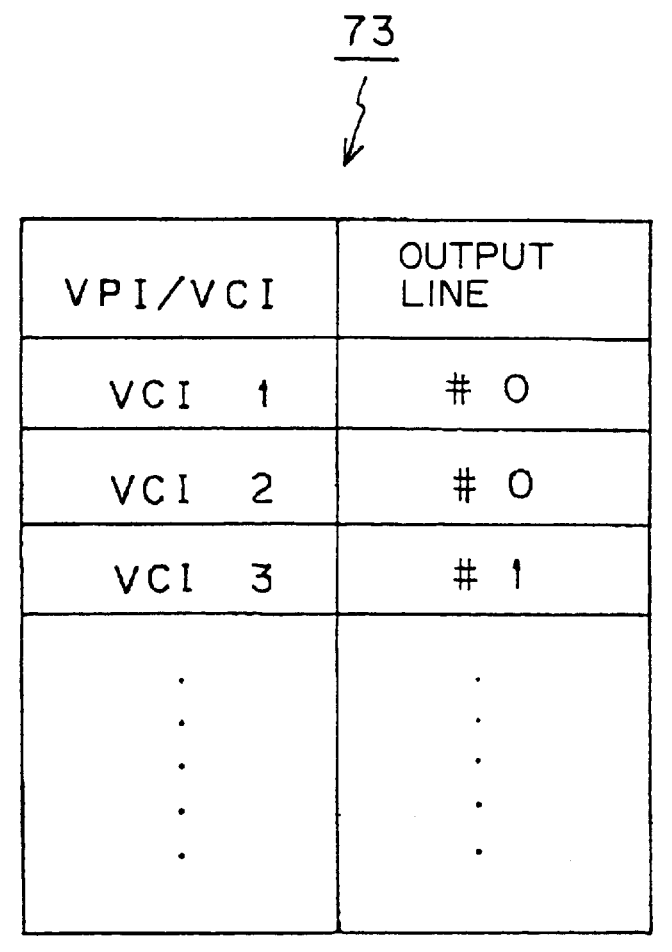

The output path table 73 stores information about an output path for each VPI/VCI. For example, the output path table 73 stores information (output path information) indicating either of output lines #0 and #1 as shown in FIG. 34. The output path information is, for example, written at the time of establishing a call.

A control memory 74 stores an address storing an input cell according to priority control information, output time information, and output path information about the input cell when the input cell is stored in the cell buffer 26. The control memory 74 has basically the same configuration as that of the control memory 28 shown in FIG. 7, but its details are different. The details of the control memory 74 will be described later.

The control unit 72 receives the output time information and the output path information from the cell output time/path control unit 71 each time a cell is input to a buffer 70. It also receives the priority control information from the tag identification unit 25. Then, the control unit 72 rewrites the contents of the chain memory 27 and the control memory 74 using this information. Additionally, the control unit 72 performs a control of writing an input cell to the cell buffer 26 and a control of reading a cell stored in the cell buffer 26 using the contents of the chain memory 27 and the control memory 74.

A selector 75 outputs a cell read from the cell buffer 26 to either #0 output line or #1 output line according to the output line information notified by the control unit 72.

Figure 35:
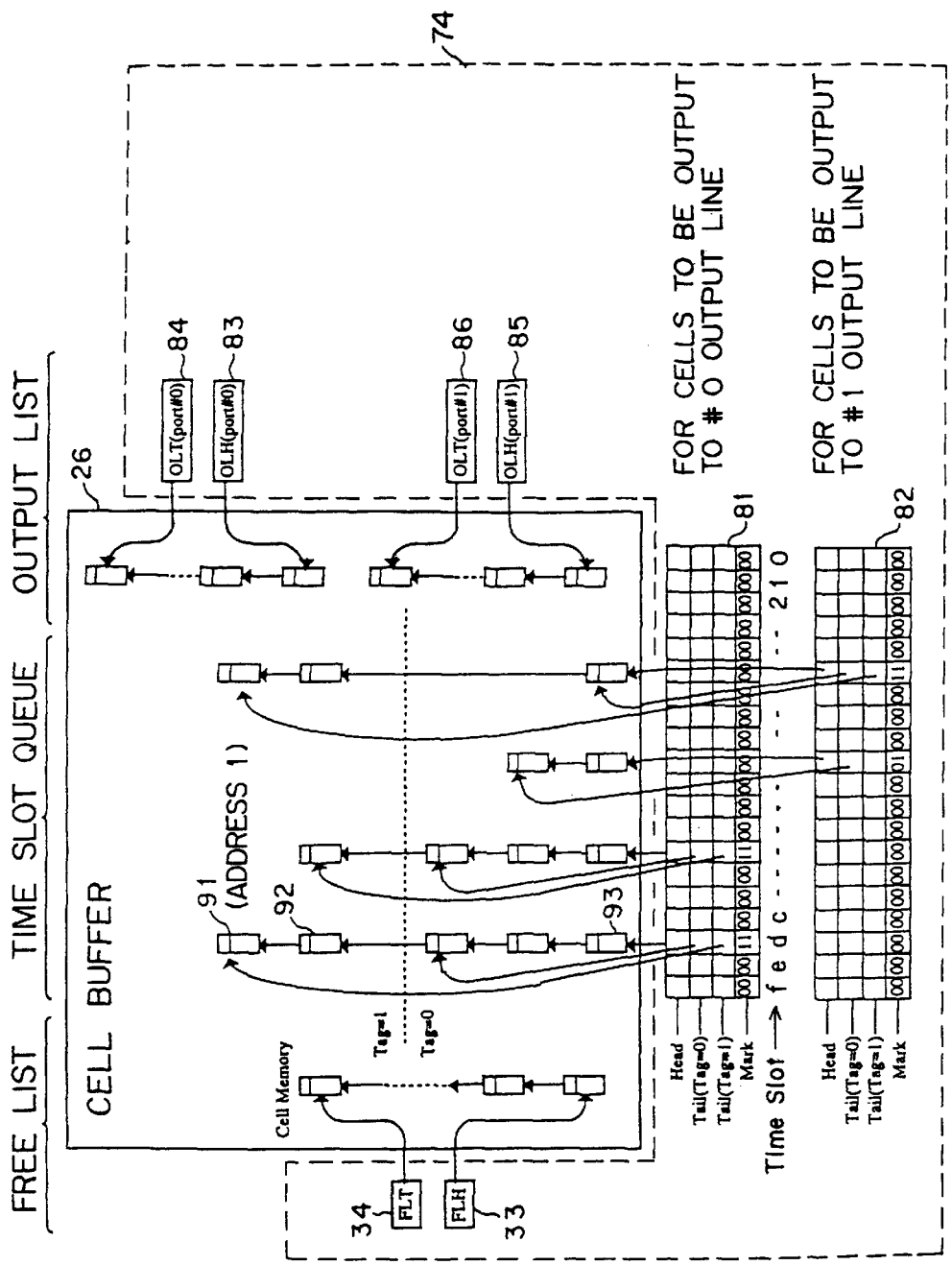
FIG. 35 shows an example of a structure of a cell buffer and a control memory.

FIG. 35 shows an example of structures of the cell buffer 26 and the control memory 74. In this figure, the same reference numerals as those used in FIG. 9 or FIG. 28 indicate the same portions.

Note that a "port#0" and a "port#1" in FIG. 35 and subsequent drawings correspond to the #0 output line and the #1 output line respectively. This is because the buffer according to the second embodiment is configured such that one output line is drawn from one port, and the output line numbers are represented by the port numbers in order to simplify a description of a pseudo-code program, etc.

A #0 entry memory 81 and a #1 entry memory 82 have the same structures as those of the entry memory 37 shown in FIG. 28. The #0 entry memory 81 is a memory for managing a chain of cells whose output path information notified by the cell output time/path control unit 71 indicates "#0", while the #1 entry memory 82 is a memory for managing a chain of cells whose output path information indicates #1.

For example, if a cell 91 is input to the buffer 70, the cell output time/path control unit 71 searches for the output time parameter table 23 and the output path table 73, retrieves output time information and output path information about the cell 91, and notifies the control unit 72 of the retrieved information. Assume that the output time information about the cell 91 is a time slot "d", and the output path information is "#0" (the #0 output line is selected). The tag identification unit 25 notifies the control unit 72 of the priority control information about the cell 91. Assume that the priority control information about the cell 91 is "Tag=1" (non-prioritized cell), and the cell 91 is written to the address 1 of the cell buffer 26. In such a case, the control unit 72 links the cell 91 to a chain of the time slot "d" corresponding to the #0 output line. That is, the control unit 72 rewrites the time slot "d" of the #0 entry memory 81. The address 1 is written to the "Tail(Tag=1)" of the time slot "d" in the #0 entry memory 81 in this case. Furthermore, the control unit 72 rewrites the chain memory 27. The cell 91 is linked to the end of the chain of the time slot "d" corresponding to the #0 output line (the cell 92 in this figure) at this time.

The FLH register 33 and the FLT register 34 are the same as those in FIG. 9 or FIG. 28. They include a first address and a last address of a free list chain where addresses in an empty area of the cell buffer 26 are linked.

When cells of a certain time slot are output a #0 output line, a #0 OLH register 83 and a #0 OLT register 84 include the first address and the last address of a chain of the cells in the time slot. For example, when cells of the time slot "d" are output, #0 entry memory 81 is searched for, the first address (at which the cell 93 is stored) of the chain in the time slot "d" is written to the #0 OLH register 83, and the last address (at which the cell 91 is stored) is written to the #0 OLT register 84.

A #1 OLH register 85 and a #1 OLT register 86 are registers used for outputting cells in a certain time slot to the #1 output line. They have the same configuration as those of the #0 OLH register 83 and the #0 OLT register 84.

The control unit 72 extracts an address from the #0 OLH register 83 and #1 OLH register in turn, reads a cell stored in the address from the cell buffer 26, and transfers the read cell to the selector SEL 75. The control unit 72 notifies the selector SEL 75 of a signal indicating "#0" when it reads a cell from the address in the #0 OLH register 83, and notifies the selector SEL 75 of a signal indicating "#1" when it reads a cell from an address in the #1 OLH register 85.

The selector SEL 75 selects an output line (output port) according to the above described output line information, and outputs the cell input to the buffer 70 to a predetermined output line.

Also in the buffer according to the second embodiment, an address from which a cell is read in an area of the cell buffer 26 is linked to the free list chain, in a similar manner as in the first embodiment. If a size of an empty area of the cell buffer 26 is smaller than a predetermined threshold value, non-prioritized cells are forcibly discarded.

Provided below is the explanation about the method for forcibly discarding non-prioritized cells in the second embodiment.

To forcibly discard the non-prioritized cells output to one particular output line, the following process is performed. When non-prioritized cells output to the #1 output line are discarded, for example, the #1 entry memory 82 is searched with any of the methods described in the first embodiment, and the non-prioritized cells in a predetermined time slot (or all of time slots) are discarded.

FIG. 36 shows a pseudo-code program describing a process of counting the number of non-prioritized cells stored in the cell buffer 26 for each output line, and forcibly discarding the non-prioritized cells to be output to an output line whose number of the non-prioritized cells is the largest.

FIG. 36A shows a process of obtaining the number of non-prioritized cells for each output line, when the number of non-prioritized cells in a time slot is assigned to a "Mark" of each slot. With this method, a Σ"Mark" is calculated for all of time slots for each output line. The method for writing the number of non-prioritized cells in a time slot to the "Mark" of each time slot takes advantage of, for example, the method described by referring to the FIGS. 16 through 18.

FIG. 36B shows a process of obtaining the number of non-prioritized cells for each output line when the "Mark" of each time slot indicates the existence/non-existence of non-prioritized cells. A "Mark Tag=1" shown in this figure indicates that the non-prioritized cells are stored in a corresponding time slot. In the configuration shown in FIG. 35, if the high-order bit of the "Mark" is "1", it corresponds to the "Mark Tag=1". According to this method, chains of all of time slots storing the non-prioritized cells are examined. Then, the number of non-prioritized cells in each time slot is obtained, and a total number of non-prioritized cells in each time slot is obtained for each output line.

FIG. 36C shows a method for obtaining the number of non-prioritized cells for each output line by incrementing a count value each time a non-prioritized cell is input to the buffer 70, and decrementing the count value each time the non-prioritized cell is read for each output line.

When the number of non-prioritized cells for each output line is obtained using any of the methods described by referring to FIGS. 36A through 36C, the control unit 72 selects an output line whose number of non-prioritized cells is the largest. The control unit 72 then forcibly discards the non-prioritized cells to be output to that output line. The method described in the first embodiment is used for determining from which time slot the non-prioritized cells are forcibly discarded in the selected output line.

As described above, with the method for forcibly discarding non-prioritized cells to be output to an output line whose number of non-prioritized cells stored in the cell buffer 26 is the largest, the heaviest load on the output line imposed by non-prioritized cells can be reduced.

FIG. 37 shows an example of a pseudo-code program describing a process of forcibly discarding all of the non-prioritized cells. This method forcibly discards all of the non-prioritized cells stored in the cell buffer 26 without using an output line to which cells are output. Accordingly, this method can free up a large amount of space in the cell buffer 26 at one time.

Figure 38:
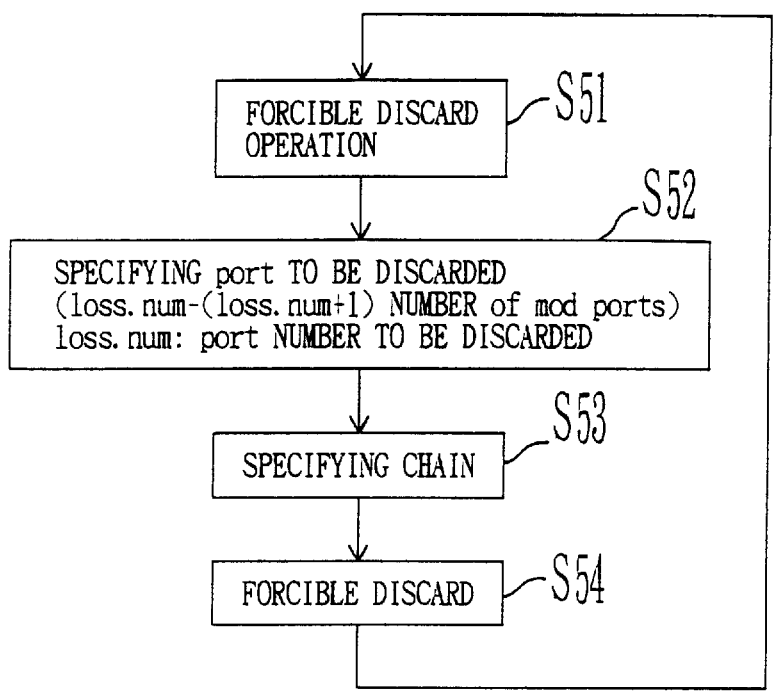
FIG. 38 is a flowchart showing a process of forcibly discarding non-prioritized cells for each output line in sequence.

FIG. 38 is a flowchart showing a process of forcibly and sequentially discarding non-prioritized cells for each output line.

If it becomes necessary to forcibly discard the non-prioritized cells since a size of an empty area in the cell buffer 26 becomes smaller than a predetermined threshold value in step S51, an output line from which the cells will be discarded is specified in step S52. In this step, an output line numbered next to the output line from which the cells are previously discarded is specified. If the number of output lines are two, both of the output lines are specified in turn. If the number of output lines is 3 or more, these output lines are specified in a cyclical order.

In step S53, from which chain the non-prioritized cells are to be discarded for an output line specified in step S52 is specified. That is, it is specified from which time slot the non-prioritized cells are to be discarded. The method for specifying a chain in step S53 is implemented by any of the methods described in the first embodiment.

In step S54, the non-prioritized cells in the chain specified in step S53 are forcibly discarded. After step S54 is completed, the process goes back to step S51, and step S52 and subsequent steps are performed if it is further required to discard cells.

As described above, the method for forcibly and sequentially discarding non-prioritized cells enables each output line to discard cells equally.

In the second embodiment, non-prioritized cells may be forcibly discarded from a time slot storing the largest number of non-prioritized cells, or from a time slot storing the smallest number of non-prioritized cells. The process performed in this case is basically the same as that performed in the first embodiment described by referring to FIGS. 16 through 18, and the same process must be performed for all of the output lines.

Figure 39:
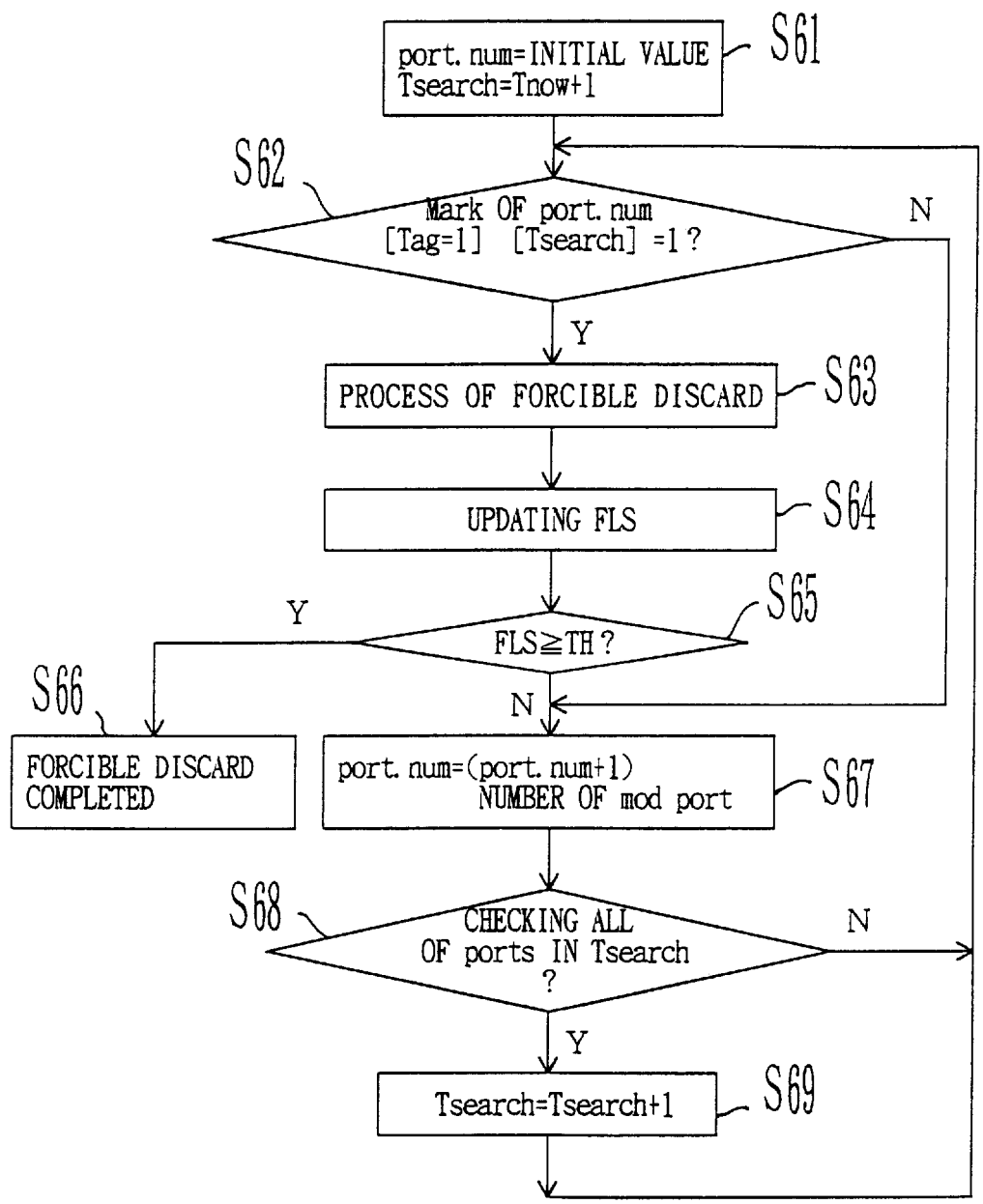
FIG. 39 is a flowchart showing a process of forcibly discarding the non-prioritized cells stored in the time slot closest to the current time in the second embodiment.

FIG. 39 is a flowchart showing a process of forcibly discarding non-prioritized cells stored in a time slot closest to the current time, in the second embodiment.

Figure 40:
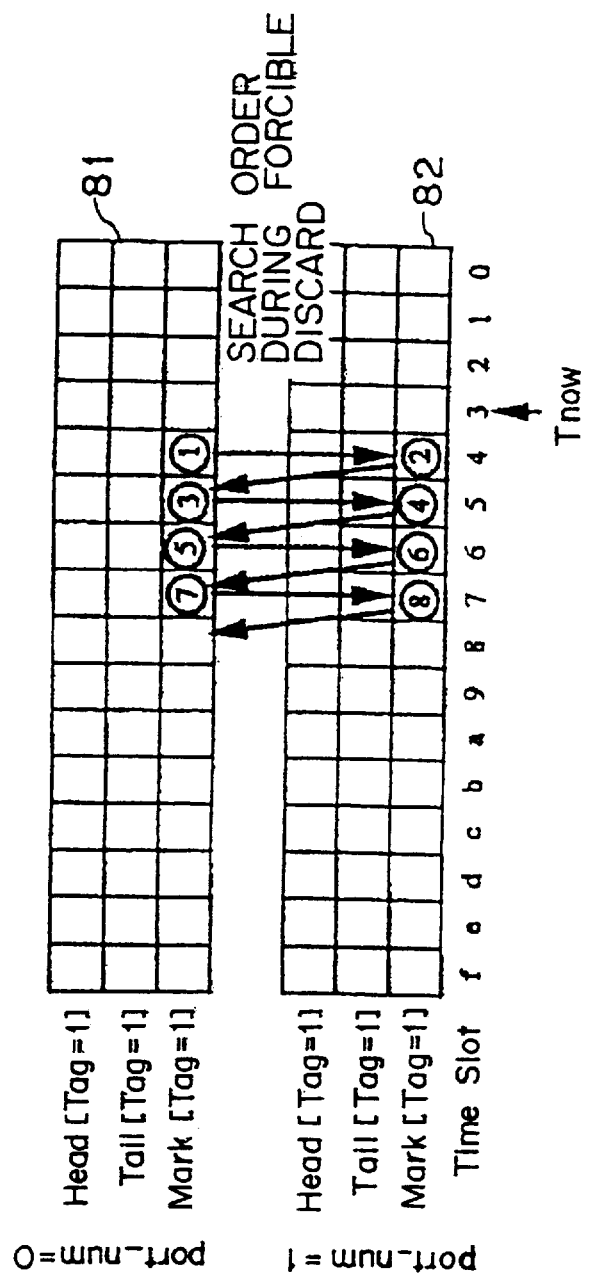
FIG. 40 shows an example of a process shown in the flowchart in FIG. 39.

In step S61, an arbitrary output line (such as #0) is specified as an initial value of an output line number. Additionally, a time slot "Tsearch" for searching for a time slot from which cells must be discarded is specified to be a time slot next to a time slot "Tnow", from which cells are being read currently. For example, as shown in FIG. 40, if the time slot "Tnow" from which cells are currently being read is the time slot 3, the time slot "Tsearch" is the time slot 4.

In step S62, it is determined whether or not the time slot "Tsearch" in an output line specified in step S61 includes a non-prioritized cell. If not, the process goes to step S67. If the time slot "Tsearch" includes the non-prioritized cell, it is forcibly discarded in step S63. Then, a size of an empty area (FLS: Free List Size) in the cell buffer 26 is updated according to the number of discarded cells in step S64.

In step S65, it is determined whether or not the size of an empty area "FLS" in the cell buffer 26 exceeds a predetermined threshold value "TH". If "FLS"exceeds the predetermined threshold value "TH", the process goes to step S66 to complete the process of forcibly discarding a non-prioritized cell. On the other hand, if it is determined that "FLS" is not greater than the threshold value TH, a next output line is specified in step S67. For example, if steps S62 and S63 are performed for the #0 output line, the #1 output line is specified in step S67.

In step S68, it is determined whether or not all of the output lines are searched for the time slot "Tsearch". If not, the process goes back to step S62. If it is determined that all of the output lines are searched, a next time slot (the time slot Tsearch+1) is specified as a time slot "Tsearch" from which cells will be discarded in step S69. Then, the process goes back to step S62.

Provided below is the specific explanation about the above described process, referring to FIG. 40. If the time slot "Tnow" which is currently performing the process of reading a cell is the time slot 3, a search is started from the time slot 4. If the number of output lines is two (#0 and #1), it is determined whether or not the time slot 4 includes a non-prioritized cell to be output to the #0 output line. If YES, the non-prioritized cell is forcibly discarded. Then, it is determined whether or not the time slot 4 includes a non-prioritized cell to be output to the #1 output line. If YES, it is forcibly discarded. This process is repeatedly and sequentially performed for each of the time slots starting from 5, and is continued until the size of an empty area "FLS" exceeds the above threshold value "TH".

In the example shown in FIG. 40, the numbers of searches for a time slot from which cells are discarded for the #1 and #2 output lines are made equal. However, a ratio of forcibly discarding cells for the #0 output line and #1 output line may be an arbitrary ratio instead of 1:1.

Figure 41:
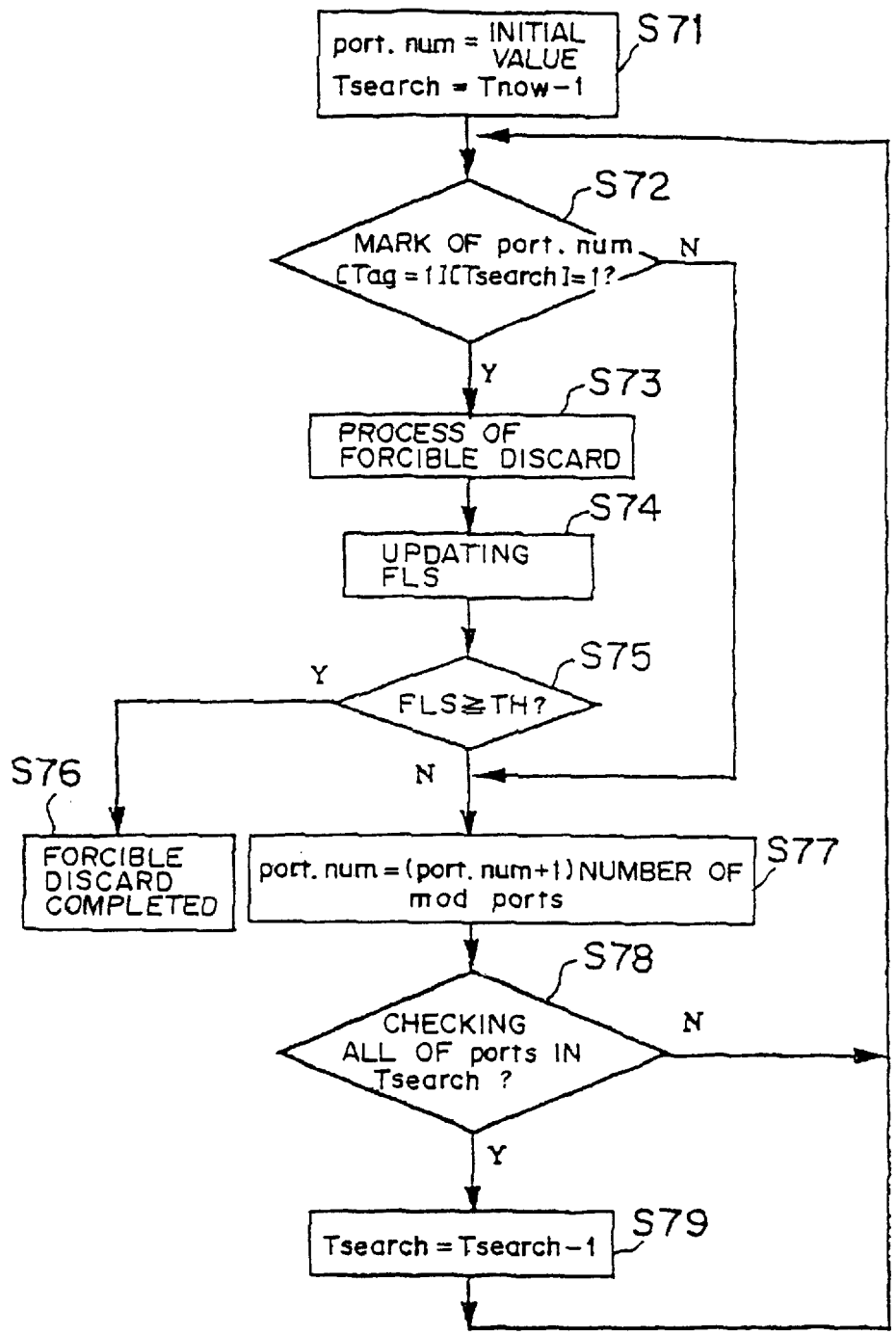
FIG. 41 is a flowchart showing a process of forcibly discarding the non-prioritized cells stored in the time slot farthest from the current time in the second embodiment.

FIG. 41 is a flowchart showing a process of forcibly discarding a non-prioritized cell stored in a time slot farthest from the current time in the second embodiment.

The process of this method (steps S71 through S79) is basically the same as that shown in FIG. 39 (steps S61 through S69). In this method, however, a search direction is the reverse to that of the method shown in FIG. 39. Therefore, the process performed in steps S71 and S79 differs from the one performed in steps S61 and S69.

Figure 42:
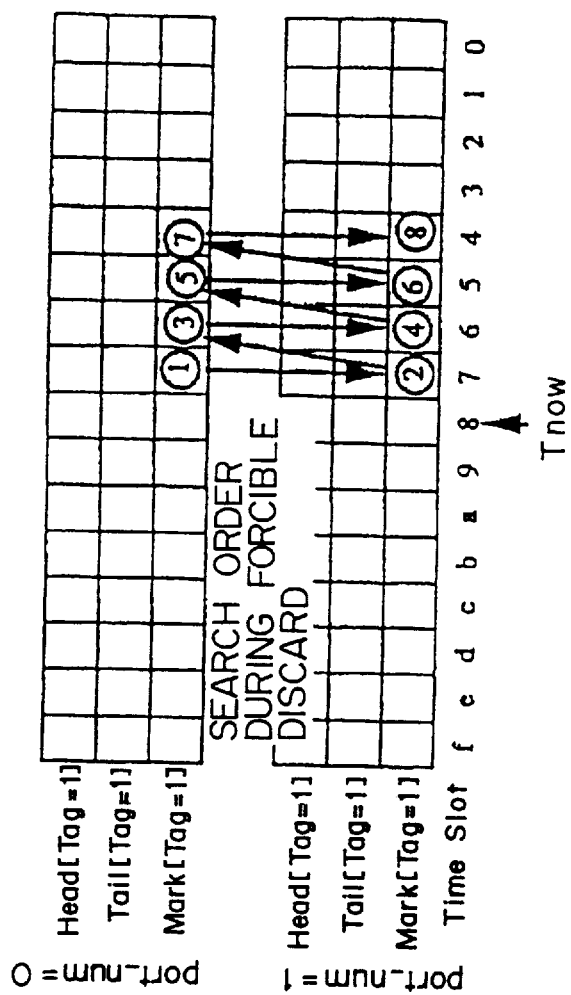
FIG. 42 is a schematic showing a process shown in the flowchart in FIG. 41.

In step S71, the time slot "Tsearch" is specified to be a time slot preceding the time slot "Tnow" where a process of reading a cell is currently performed. As shown in FIG. 42, if the time slot "Tnow" where the process of reading a cell is currently performed is the time slot 8, the time slot "Tsearch" is the time slot 7. In step S79, the preceding time slot (time slot Tsearch−1) is specified to be a time slot "Tsearch" from which a cell must be discarded.

The explanation about the above described process is provided below, referring to FIG. 42. Since the time slot "Tnow" where the process of reading a cell is currently performed is the time slot 8, a search is started from the time slot 7. It is determined whether or not the time slot 7 includes a non-prioritized cell to be output to the #0 output line. If YES, it is forcibly discarded. Then, it is determined whether or not the time slot 7 includes a non-prioritized cell to be output to the #1 output line. If YES, it is forcibly discarded. This process is sequentially performed for each of the time slots 6, 5, 4, . . . . This process is repeated until the size of an empty area "FLS" in the cell buffer 26 exceeds the above described threshold value "TH".

FIG. 43 shows examples of variations of the buffer 70 according to the second embodiment. In one implementation of the second embodiment, an entry memory is arranged for each output line as shown in FIG. 35. That is, even if cells must be output to an identical time slot, they are linked as an independent chain for each output line. With the configuration shown in FIG. 43, the cells to be output to the same time slot are linked as one chain without being separated for each output line. This method is hereinafter explained by referring to FIG. 43.

FIG. 43A shows a method for forming one chain by linking each chain arranged for each output line for each time slot (the chain arranged for each output line shown in FIG. 35) as it is. In this case, linking chains is performed in the order of a prioritized cell output to the #0 output line, a non-prioritized cell output to the #0 output line, a prioritized cell output to the #1 output line, and a non-prioritized cell output to the #1 output line. The cells are read from the cell buffer 26 in this order.

FIG. 43B shows a method for forming a chain in decreasing order of priority assigned to cells. In this case, one chain is formed by linking a prioritized cell output to the #0 output line, a prioritized cell output to the #1 output line, a non-prioritized cell output to the #0 output line, and a non-prioritized cell output to the #1 output line. The cells are read from the cell buffer 26 in this order.

With these methods shown in FIGS. 43A and 43B, if the number of output lines is two, the above described one chain can be specified using one "Head" (information indicating the beginning of the chain) and four "Tails" (information indicating a cell priority and an output line).

Figure 44:
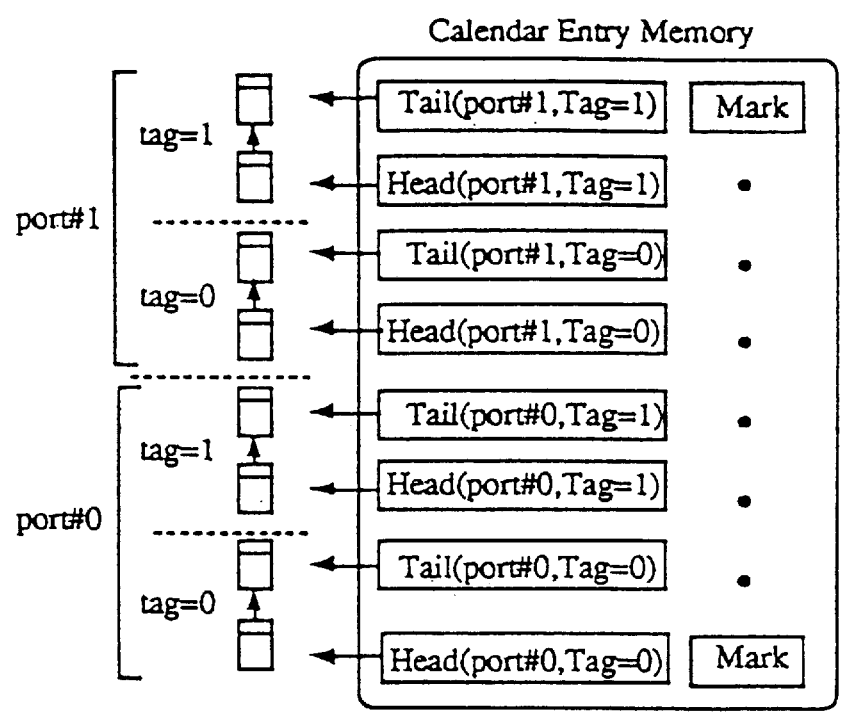
FIG. 44 is a schematic showing an increased memory amount when chains are separately formed.

In the meantime, with the method for forming each separate chain for each output line, two chains are formed. To specify these two chains, four "Heads" and four "Tails" are required as shown in FIG. 44. The numbers of the "Heads" and "Tails" are the same even if a cell priority is divided into two degrees (prioritized/non-prioritized) or if a chain is arranged for each cell priority.

The "Head" and "Tail" are arranged for each time slot, and correspond to an area storing addresses in the cell buffer 26 in the control memory 74. Accordingly, as the number of the "Heads" and "Tails" becomes smaller, the amount of the control memory 74 can be reduced. Especially, in a buffer with a large number of time slots (such as the one with 512 time slots), the methods shown in FIG. 43A or 43B greatly contribute to reducing the amount of the control memory 74.

Figure 45:
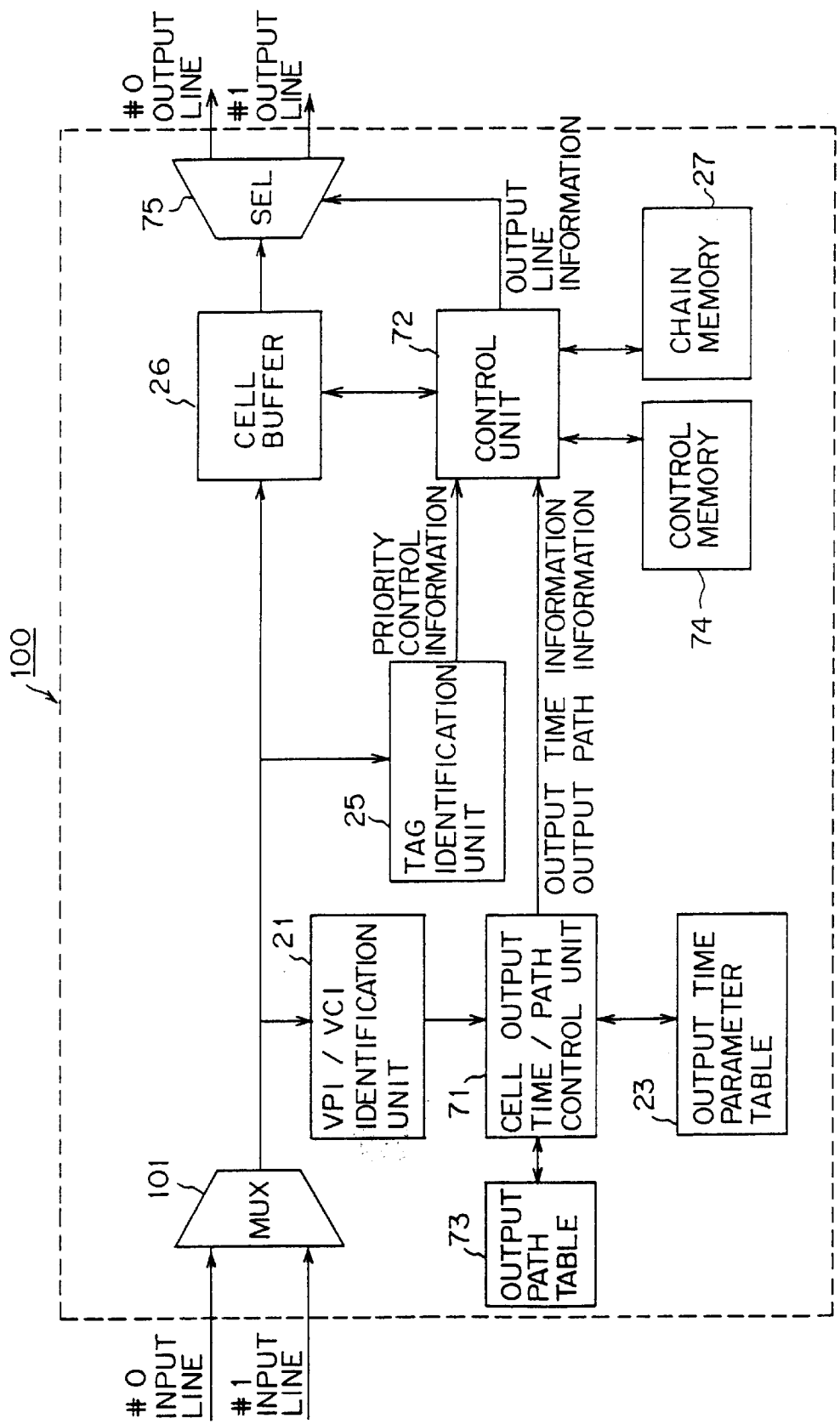
FIG. 45 is a functional block diagram showing the buffer according to the third embodiment of the present invention.

FIG. 45 is a functional block diagram showing a buffer according to the third embodiment of the present invention. A buffer 100 shown in this figure, performs a priority control and a shaping process for a cell input from a plurality of input lines, selects a predetermined path from a plurality of output lines, and outputs the cell. That is, the buffer 100 is equipped with a switching capability in addition to the priority control capability of cells and the shaping process capability. Note that the same reference numerals as those used in FIG. 33 indicate the same portions.

The buffer 100 according to the third embodiment employs a multiplexer MUX 101 in addition to a configuration of the buffer 70 according to the second embodiment shown in FIG. 33. This buffer performs the same process as that of the above described buffer 70 for a cell input from a plurality of input lines (#0 and #1). That is, the buffer 100 performs the priority control process and the shaping process for the cell input from the #0 input line or the #1 input line, and outputs that cell to either of output lines (#0 or #1) indicated by a VPI/VCI of that cell. In other words, the buffer 100 has a switching capability for outputting a cell input from an arbitrary input line among a plurality of input lines to an output line indicated by a VPI/VCI of that cell.

As described above, the buffer according to the third embodiment can implement a switch having the priority control capability and the shaping process capability.

What is claimed is:

1. A buffer control system for use with a network routing fixed-length packets respectively composed of transfer data and control information added to the transfer data, to which priority information is assigned, according to the control information, comprising:

storage means for storing an input fixed-length packet;

output time determination means for determining an output time according to the control information of the input fixed-length packet, and generating output time information for the input fixed-length packet;

identification means for identifying a priority assigned to the input fixed-length packet, and generating priority information about the input fixed-length packet; and control means for controlling a process of writing the input fixed-length packet to said storage means, and a process of reading the input fixed-length packet from said storage means according to the output time information and the priority information.

2. The buffer control system as set forth in claim 1, further comprising:

cell address storage means for storing a write address corresponding to the output time specified by the output time information and the priority indicated by the priority information, when the fixed-length packet is written to said storage means;

empty address storage means for storing an address of an empty area in said storage means; and read address storage means for retrieving an address corresponding to a read time from said cell address storage means, and storing the retrieved address, when the fixed-length packet is read from said storage means, wherein:

said control means reads the fixed-length packet from said storage means using the address stored in said read address storage means.

3. The buffer control system as set forth in claim 2, wherein:

the address is retrieved from said cell address storage means in decreasing order of priority indicated by the priority information, and written to said read address storage means.

4. The buffer control system as set forth in claim 2, further comprising:

a chain memory for storing addresses stored in said storage means which include fixed-length packets in the form of a chain, when one or a plurality of fixed-length packets are stored in said storage means corresponding to the output time specified by the output time information and the priority indicated by the priority information, wherein:

said cell address storage means stores a first address and a last address among the addresses stored in said chain memory.

5. The buffer control system as set forth in claim 2, further comprising:

a chain memory for storing addresses stored in said storage means which stores one or a plurality of fixed-length packets in the form of a chain, when one or the plurality of fixed-length packets are stored in said storage means corresponding to the output time specified by the output time information, wherein:

said cell address storage means stores a first address and a last address among the addresses stored in said chain memory.

6. The buffer control system as set forth in claim 1, further comprising:

a chain memory for storing one or a plurality of addresses where one or a plurality of fixed-length packets are stored in said storage means in the form of a chain according to the order of priorities, when one or the plurality of fixed-length packets are stored in said storage means corresponding to the output time specified by the output time information, wherein:

said control means sequentially retrieves the address stored in said chain memory, and reads the fixed-length packet from said storage means using the retrieved address.

7. The buffer control system as set forth in claim 1, wherein:

said control means discards a fixed-length packet with the lowest priority among the fixed-length packets stored in said storage means, when a size of an empty area in said storage means is equal to or smaller than a first predetermined value.

8. The buffer control system as set forth in claim 7, wherein:

the number of fixed-length packets with the lowest priority stored in said storage means is counted for each output time, and the fixed-length packets corresponding to a time whose number of the fixed-length packets with the lowest priority is the largest are discarded.

9. The buffer control method as set forth in claim 7, wherein:

the number of fixed-length packets with the lowest priority stored in said storage means is counted for each output time, and the fixed-length packets corresponding to a time whose number of the fixed-length packets with the lowest priority is the smallest, are discarded.

10. The buffer control system as set forth in claim 7, wherein:

a fixed-length packet whose expected output time is the farthest from a current time among the fixed-length packets with the lowest priority stored in said storage means, is discarded.

11. The buffer control system as set forth in claim 7, wherein:
a fixed-length packet whose expected output time is the closest to the current time among the fixed-length packets with the lowest priority stored in said storage means, is discarded.

12. The buffer control system as set forth in claim 7, wherein:
the discarding process is repeatedly performed until the size of the empty area in said storage means reaches a second predetermined value.

13. The buffer control system as set forth in claim 7, wherein:
said control means registers the expected output time of the fixed-length packet with the lowest priority, which is written to said storage means most recently, and discards the fixed-length packet with the lowest priority, which is stored corresponding to the expected output time.

14. The buffer control system as set forth in claim 7, wherein:
all of fixed-length packets with the lowest priority stored in said storage means are discarded.

15. A multiplexing system for use in a network routing fixed-length packets which are respectively composed of transfer data and control information added to the transfer data, and to which priority information is assigned, according to the control information, comprising:
a plurality of buffers, each of which comprising:
storage means for storing an input fixed-length packet;
output time determination means for determining an output time according to the control information of the input fixed-length packet, and generating output time information for the input fixed-length packet;
identification means for identifying a priority assigned to the input fixed-length packet, and generating priority information for the input fixed-length packet; and
control means for controlling a process of writing the input fixed-length packet to said storage means, and a process of reading the input fixed-length packet from said storage means according to the output time information and the priority information; and
a multiplexer for multiplexing the input fixed-length packet output from said plurality of buffers.

16. A multiplexing system for use in a network routing fixed-length packets which are respectively composed of transfer data and control information added to the transfer data, and to which priority information is assigned, according to the control information, comprising:
a multiplexer for multiplexing an input fixed-length packet coming from a plurality of input lines; and
a buffer including:
storage means for storing the input fixed-length packet;
output time determination means for determining an output time according to the control information of the input fixed-length packet, and generating output time information for the input fixed-length packet;
identification means for identifying a priority assigned to the input fixed-length packet, and generating priority information for the input fixed-length packet; and
control means for controlling a process of writing the input fixed-length packet to said storage means, and a process of reading the input fixed-length packet from said storage means according to the output time information and the priority information.

17. A distributing system for use in a network routing fixed-length packets which are respectively composed of transfer data and control information added to the transfer data, and to which priority information is assigned, according to the control information, comprising:
a selector, connected to an input line and to a plurality of output lines, for distributing an input fixed-length packet coming from the input line to one of the plurality of output lines according to control information of the fixed-length packet; and
a plurality of buffers, each of which is provided or the plurality of output lines and comprises:
storage means for storing the input fixed-length packet;
output time determination means for determining an output time according to the control information of the input fixed-length packet, and generating output time information for the input fixed-length packet;
identification means for identifying a priority assigned to the input fixed-length packet, and generating priority information for the input fixed-length packet; and
control means for controlling a process of writing the input fixed-length packet to said storage means, and a process of reading the input fixed-length packet from said storage means according to the output time information and the priority information.

18. A buffer control system for use with a network routing fixed-length packets respectively composed of transfer data and control information added to the transfer data, and to which priority information is assigned, according to the control information, comprising:
storage means for storing an input fixed-length packet;
output time determination means for determining an output time according to the control information of the input fixed-length packet, and generating output time information about the fixed-length packet;
identification means for identifying a priority assigned to the input fixed-length packet, and generating priority information about the input fixed-length packet;
control information storage means for storing the output time information and the priority information corresponding to the input fixed-length packet, when the input fixed-length packet is written to said storage means; and
control means for controlling a process of reading the input fixed-length packet from said storage means according to the contents of said control information storage means.

19. A buffer control system for use with a network routing fixed-length packets respectively composed of transfer data and control information added to the transfer data, and which priority information is assigned, according to the control information, comprising:
storage means for storing an input fixed-length packet;
output time determination means for determining an output time according to the control information of the input fixed-length packet, and generating output time information about the input fixed-length packet;
identification means for identifying a priority assigned to the input fixed-length packet, and generating priority information about the input fixed-length packet;
output path determination means for determining an output path according to the control information of the input fixed-length packet, and generating output path information about the input fixed-length packet;

control means for controlling a process of writing the input fixed-length packet to said storage means, and a process of reading the input fixed-length packet from said storage means according to the output time information, the priority information, and the output path information, and a selector for outputting the input fixed-length packet read from said storage means to a path specified by the output path information.

20. The buffer control system as set forth in claim 19, wherein:

said control means discards a fixed-length packet with the lowest priority among fixed-length packets stored in said storage means, when a size of an empty area in said storage means is equal to or smaller than a first predetermined value.

21. The buffer control system as set forth in claim 20, wherein:

a priority control is performed for each output path by discarding the fixed-length packet with the lowest priority to be output to a predetermined output path.

22. The buffer control system as set forth in claim 20, wherein:

the number of fixed-length packets with the lowest priority is counted for each output path, and the fixed-length packets with the lowest priority to be output to an output path whose number of fixed-length packets with the lowest priority is the largest, are discarded.

23. The buffer control system as set forth in claim 20, wherein:

all of the fixed-length packets with the lowest priority stored in said storage means are discarded.

24. The buffer control system as set forth in claim 20, wherein:

the fixed-length packets with the lowest priority stored in said storage means are sequentially discarded for each output path.

25. The buffer control system as set forth in claim 20, wherein:

the number of the fixed-length packets with the lowest priority stored in said storage means is counted for each output time and for each output path, and the fixed-length packets corresponding to an output time and an output path whose numbers of the fixed-length packets are the largest are discarded.

26. The buffer control system as set forth in claim 20, wherein:

the number of the fixed-length packets with the lowest priority stored in said storage means is counted for each output time and for each output path, and the fixed-length packets corresponding to an output time and an output path whose numbers of the fixed-length packets are the smallest are discarded.

27. The buffer control system as set forth in claim 20, wherein:

a process of discarding the fixed-length packets whose expected output time is the farthest from a current time among the fixed-length packets with the lowest priority stored in said storage means, to be output to a predetermined output path, is iterated until the size of the empty area in said storage means reaches a second predetermined value.

28. The buffer control system as set forth in claim 20, wherein:

a process of discarding the fixed-length packets whose expected output time is the closest to the current time among the fixed-length packets with the lowest priority stored in said storage means, to be output to a predetermined output path, is iterated until the size of the empty area in said storage means reaches a second predetermined value.

29. A buffer control system for use in a switch in a network routing fixed-length packets respectively composed of transfer data and control information added to the transfer data, to which priority information is assigned, according to the control information, comprising:

storage means for storing a fixed-length packet input from a plurality of input lines;

output time determination means for determining an output time according to the control information of the fixed-length packet, and generating output time information about the fixed-length packet;

identification means for identifying a priority assigned to the fixed-length packet, and generating priority information about the fixed-length packet;

output path determination means for determining an output path according to the control information of the fixed-length packet, and generating output path information about the fixed-length packet;

control means for controlling a process of writing the fixed-length packet to said storage means, and a process of reading the fixed-length packet from said storage means according to the output time information, the priority information, and the output path information, and a selector for outputting the fixed-length packet read from said storage means to a path specified by the output path information.

* * * * *